(12) United States Patent
Meyer

(10) Patent No.: US 12,079,844 B2
(45) Date of Patent: *Sep. 3, 2024

(54) SYSTEMS AND METHODS FOR RESOLVING ADVERTISEMENT PLACEMENT CONFLICTS

(71) Applicant: ROVI GUIDES, INC., San Jose, CA (US)

(72) Inventor: Samuel Meyer, Boston, MA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/140,874

(22) Filed: Apr. 28, 2023

(65) Prior Publication Data

US 2023/0334533 A1 Oct. 19, 2023

Related U.S. Application Data

(63) Continuation of application No. 17/570,702, filed on Jan. 7, 2022, now Pat. No. 11,676,181, which is a (Continued)

(51) Int. Cl.
*G06Q 30/00* (2023.01)
*G06Q 30/0241* (2023.01)
*G06Q 30/0242* (2023.01)

(52) U.S. Cl.
CPC ..... *G06Q 30/0277* (2013.01); *G06Q 30/0241* (2013.01); *G06Q 30/0243* (2013.01)

(58) Field of Classification Search
None
See application file for complete search history.

(56) References Cited

U.S. PATENT DOCUMENTS 5,140,671 A * 8/1992 Hayes ............... G06F 11/362
714/E11.21
5,850,617 A * 12/1998 Libby ............... B64G 1/244
701/25

(Continued)

FOREIGN PATENT DOCUMENTS

EP 1394694 A1 3/2004

OTHER PUBLICATIONS

Chatwin; Computational Challenges in Online Advertising; ACC; pp. 5990-6007; 2013.*

(Continued)

*Primary Examiner* — Radu Andrei
(74) *Attorney, Agent, or Firm* — Haley Guiliano LLP

(57) ABSTRACT

Systems and methods are described herein for resolving advertisement placement conflicts. Specifically, a number of parameters may be entered into a system in order to distribute advertisements into advertisement slots. In many instances, a combination of these parameters causes a conflict in the system where all the parameters cannot be applied in order to place advertisements into advertisement slots. The conflict may be resolved by using an advertisement assignment model to determine which parameters may be relaxed in order to arrive at an optimal solution that violates a smallest number of parameters having the least priority. When such a solution is found, the advertisement assignment model may be modified and advertisements may be placed into advertisement slots based on the modified advertisement assignment model.

20 Claims, 8 Drawing Sheets

Related U.S. Application Data continuation of application No. 16/899,710, filed on Jun. 12, 2020, now Pat. No. 11,250,478, which is a continuation of application No. 15/378,359, filed on Dec. 14, 2016, now Pat. No. 10,719,856.

(60) Provisional application No. 62/407,759, filed on Oct. 13, 2016.

(56) References Cited

U.S. PATENT DOCUMENTS

| | | | |
|---|---|---|---|
| 5,959,574 A * | 9/1999 | Poore, Jr. | G01S 13/726 342/96 |
| 6,094,580 A * | 7/2000 | Yu | H04W 16/18 455/449 |
| 6,094,590 A | 7/2000 | Kan et al. | |
| 6,239,794 B1 | 5/2001 | Yuen et al. | |
| 6,388,714 B1 | 5/2002 | Schein et al. | |
| 6,564,378 B1 | 5/2003 | Satterfield et al. | |
| 6,756,997 B1 | 6/2004 | Ward et al. | |
| 7,165,098 B1 | 1/2007 | Boyer et al. | |
| 7,554,980 B1 * | 6/2009 | Yeh | H04L 45/54 707/999.001 |
| 7,761,892 B2 | 7/2010 | Ellis et al. | |
| 8,046,801 B2 | 10/2011 | Ellis et al. | |
| 8,340,463 B1 * | 12/2012 | Cho | G06F 18/295 382/284 |
| 8,880,438 B1 * | 11/2014 | Liu | G06N 20/00 706/46 |
| 9,280,618 B1 * | 3/2016 | Bruce | G06F 30/20 |
| 2002/0136233 A1 * | 9/2002 | Chen | H04W 72/1215 370/445 |
| 2002/0174430 A1 | 11/2002 | Ellis et al. | |
| 2003/0004880 A1 * | 1/2003 | Banerjee | G06Q 30/02 707/E17.116 |
| 2003/0110499 A1 | 6/2003 | Knudson et al. | |
| 2004/0054577 A1 * | 3/2004 | Inoue | G06Q 30/02 348/E7.063 |
| 2004/0059966 A1 * | 3/2004 | Chan | G06F 11/0793 714/48 |
| 2005/0147322 A1 * | 7/2005 | Saed | G06T 5/90 382/284 |
| 2005/0251827 A1 | 11/2005 | Ellis et al. | |
| 2005/0256643 A1 * | 11/2005 | Boitnott | G01V 11/00 702/6 |
| 2007/0028297 A1 * | 2/2007 | Troyansky | H04L 63/1408 726/2 |
| 2008/0022301 A1 * | 1/2008 | Aloizos | H04N 21/812 725/34 |
| 2008/0097838 A1 * | 4/2008 | Lin | G06Q 30/0247 705/14.46 |
| 2008/0297408 A1 * | 12/2008 | Dai | G01S 19/44 342/357.38 |
| 2009/0144217 A1 * | 6/2009 | Bergsten | G06N 5/025 706/47 |
| 2009/0248513 A1 * | 10/2009 | Aggarwal | G06Q 30/0276 705/37 |
| 2010/0057507 A1 * | 3/2010 | Berberich | G06Q 10/063114 705/7.26 |
| 2010/0153885 A1 | 6/2010 | Yates | |
| 2010/0214584 A1 * | 8/2010 | Takahashi | H04N 1/00442 358/1.9 |
| 2010/0250553 A1 * | 9/2010 | Higuchi | G06F 16/51 707/748 |
| 2010/0315659 A1 * | 12/2010 | Tatsuno | G06F 3/1208 358/1.5 |
| 2012/0284595 A1 * | 11/2012 | Lyons | G06F 40/103 715/202 |
| 2013/0091140 A1 * | 4/2013 | Attwell | G06Q 10/1093 707/741 |
| 2014/0164311 A1 * | 6/2014 | Junker | G06N 5/025 706/47 |
| 2014/0201655 A1 * | 7/2014 | Mahaffey | G06F 3/04817 715/765 |
| 2014/0201681 A1 * | 7/2014 | Mahaffey | H04M 1/72454 715/846 |
| 2014/0297400 A1 * | 10/2014 | Sandholm | G06Q 30/0273 705/14.42 |
| 2014/0310069 A1 * | 10/2014 | Beraudier | G06Q 10/00 705/7.36 |
| 2015/0181310 A1 * | 6/2015 | Hancock | H04N 21/812 725/32 |
| 2015/0199724 A1 * | 7/2015 | Negruseri | G06Q 30/0264 705/14.61 |
| 2015/0248698 A1 * | 9/2015 | Bhattacharjee | G06Q 30/0277 707/723 |
| 2015/0331900 A1 * | 11/2015 | Attwell | H04H 60/06 707/691 |
| 2015/0336581 A1 * | 11/2015 | Slaton | B60W 30/146 701/93 |
| 2016/0063449 A1 * | 3/2016 | Duggan | G06Q 10/1095 705/7.19 |
| 2016/0224681 A1 * | 8/2016 | Iyer | G06F 3/0482 |
| 2016/0301984 A1 * | 10/2016 | MacTiernan | H04N 21/26258 |
| 2017/0177337 A1 * | 6/2017 | Golan | G06Q 30/0277 |

OTHER PUBLICATIONS

Skoutas; Ranking and Clustering Web Services; IEEE; IEEE; pp. 163-177; 2010.*

Chatwin, "An overview of computational challenges in online advertising," American Control Conference (ACC), Washington, DC, pp. 5990-6007 (Jun. 17-19, 2013).

Skoutas et al., "Ranking and Clustering Web Services Using Multicriteria Dominance Relationships," IEEE, 3(3):163-177 (2010).

* cited by examiner

600

602 — Receive an Advertisement Assignment Model that Includes a Plurality of Parameters that Define How a Plurality of Advertisements Should be Assigned to a Plurality of Advertisement Slots

604 — Simulate an Assignment of the Plurality of Advertisements to the Plurality of Advertisement Slots Based on the Plurality of Parameters

606 — Determine, Based on the Simulating, that there is a Conflict that Prevents Assigning the Plurality of Advertisements to the Plurality of Advertisement Slots without Violating a Parameter of the Plurality of Parameters

608 — In Response to the Determining, Retrieve a Parameter Score for Each Parameter of the Plurality of Parameters, where Each Parameter Score Indicates an Importance of the Corresponding Parameter

610 — Calculate a Total Parameter Score for the Advertisement Assignment Model Based on the Parameter Scores

612 — Identify at Least One Parameter to Remove from the Advertisement Assignment Model by:

614 — Determining at Least One Conflict Parameter whose Removal from the Advertisement Assignment Model Causes the Conflict to be Resolved (A)

FIG. 6

SYSTEMS AND METHODS FOR RESOLVING ADVERTISEMENT PLACEMENT CONFLICTS

CROSS-REFERENCE TO RELATED APPLICATIONS

This application is a continuation of U.S. patent application Ser. No. 17/570,702, filed Jan. 7, 2022, which is a continuation of U.S. patent application Ser. No. 16/899,710, filed Jun. 12, 2020, now U.S. Pat. No. 11,250,478, which is a continuation of U.S. patent application Ser. No. 15/378,359, filed Dec. 14, 2016, now U.S. Pat. No. 10,719,856, which claims the benefit of U.S. Provisional Application No. 62/407,759, filed Oct. 13, 2016. The disclosures of which are hereby incorporated by reference herein in their entireties.

BACKGROUND

Various advertisement assignment systems are currently available to users. Some of these systems enable a user (e.g., an advertiser) to assign multiple advertisements to multiple advertisement slots, respectively. In certain instances, these assignments create conflicts that prevent advertisements to be properly assigned to advertisement slots. Current advertisement assignment systems are not able to deal with these conflicts.

SUMMARY

Therefore, systems and methods are described herein for resolving advertisement placement conflicts. Specifically, a number of parameters may be entered into a system in order to assign advertisements to advertisement slots. For example, one of the parameters may instruct the system to keep the cost to a specific advertiser under one million dollars for a specific time period. Another parameter may instruct the system to evenly spread the advertisement slots between different advertisers for a specific time period. In some instances, a combination of these parameters causes a conflict in the system where the system is not able to apply all the parameters in order to place advertisements into advertisement slots. The conflict may be resolved by using an advertisement assignment model to determine which parameters may be relaxed in order to arrive at an optimal solution that violates a smallest number of parameters having the least priority. When such a solution is found, the advertisement assignment model may be modified and advertisements may be placed into advertisement slots based on the modified advertisement assignment model.

In some aspects, an advertisement assignment application may be used to resolve the advertisement placement conflicts. It should be noted that the system for resolving advertisement placement conflicts will be described using the advertisement assignment application. However, the system may be implemented using one or more applications on different hardware configurations.

The advertisement assignment application may receive multiple parameters included in an advertisement assignment model that are to be used to place advertisements into advertisement slots. Specifically, the advertisement assignment application may receive an advertisement assignment model that includes a plurality of parameters that define how a plurality of advertisements should be assigned to a plurality of advertisement slots. For example, five advertisement slots may be available for placement of ten possible different advertisements from three advertisers (e.g., four advertisements from one advertiser and three advertisements from each of the other two advertisers). This information along with input parameters (e.g., each advertiser must have at least one advertisement slot and other suitable input parameters) may constitute an advertisement assignment model. The advertisement assignment model may include any other and any number of parameters. For example, another parameter may indicate that advertiser A must have all of its advertisements placed into the advertisement slots.

The advertisement assignment application may analyze the advertisement assignment model in order to determine whether all the parameters may be properly applied when placing advertisements into available advertisement slots. For example, the advertisement assignment application may simulate an assignment of the plurality of advertisements to the plurality of advertisement slots based on the plurality of parameters. The advertisement assignment application may iterate through each parameter in the model and simulate assigning advertisements to advertisement slots based on those parameters. When all parameters are applied to the advertisement slots, the advertisement assignment application may generate simulation results.

In some instances, the simulation results may indicate that all parameters may not be applied to the advertisement slots without violating at least one parameter. Specifically, the advertisement assignment application may determine, based on the simulating, that there is a conflict that prevents assigning the plurality of advertisements to the plurality of advertisement slots without violating a parameter of the plurality of parameters. To continue with the example above, the advertisement assignment model may include five advertisement slots, ten advertisements and three advertisers where a first advertiser has four advertisements and the second and third advertisers have three advertisements each. The advertisement assignment model may have two parameters. The first parameter may indicate that each advertiser must be allocated at least one advertisement slot, while the second parameter may indicate that the advertiser with four advertisements must have each advertisement fill an advertisement slot. It should be noted that far more complex advertisement assignment models may be processed by the advertisement assignment application, and this particular advertisement assignment model is used for illustration purposes.

The advertisement assignment application may determine that both parameters may not be applied to the advertisement slots because those parameters create a conflict. Specifically, if each advertiser gets one advertisement slot the advertiser with four advertisements cannot be allocated an advertisement slot for each advertisement as there are only five advertisement slots. The reverse is also true, where, if the advertiser with four advertisements is allocated an advertisement slot for each advertisement, then each advertiser cannot be allocated at least one advertisement slot of the total of five advertisement slots.

The advertisement assignment application may, in response to the determination above, attempt to resolve the conflict. Specifically, the advertisement assignment application may, in response to the determining, retrieve a respective parameter score for each parameter of the plurality of parameters, where each parameter score indicates an importance of the corresponding parameter. In the example above, the advertisement assignment application may retrieve a parameter score for the first parameter. The parameter score may indicate that the first parameter may not be particularly important because the system may allocate other advertisement slots to the advertisers on a different day. Thus, the parameter score associated with the first parameter may be a low number (e.g., five). However, the second parameter may be very important, for example, because there is a contractual obligation owed to the first advertiser for those advertisement slots. Thus, the second parameter score may be high (e.g., fifty).

The advertisement assignment application may calculate a total parameter score for the advertisement assignment model based on the retrieved parameter scores. For example, the advertisement assignment application may calculate a sum of the two parameter scores retrieved above (i.e., fifty-five). In some embodiments, parameter scores may be weighted based on the importance of the specific parameter in the specific advertisement assignment model.

The media guidance may identify at least one parameter to remove from the advertisement assignment model by taking the actions described below. The advertisement assignment application may select at least one conflict parameter, whose removal from the advertisement assignment model causes the conflict to be resolved. The above-exemplified advertisement assignment model may include other parameters. For example, a third parameter may indicate that the second advertiser must have at least one advertisement slot. Also, a fourth parameter may indicate that the third advertiser must have at least one advertisement slot. Each of the third and the fourth parameters may have a parameter score of five. In this example, the advertisement assignment application may identify that removing the second parameter or the first parameter resolves the conflict.

The advertisement assignment application may calculate the parameter scores based on removing one or more parameters to resolve the conflict. Specifically, the advertisement assignment application may calculate a plurality of different total parameter scores based on different configurations of the plurality of parameters in the advertisement assignment model, where each calculated different total parameter score is based on the removal, from the advertisement assignment model, of different ones of the at least one conflict parameter. For example, in the advertisement model described above, the four parameters may have a sum of parameter scores equal to sixty-five. The advertisement assignment application may determine that the first and the second parameters are in conflict and that removing one of those parameters resolves the conflict. The advertisement assignment application may calculate a sum of the parameters, first excluding the first parameter and then excluding the second parameter, or vice versa, to determine that the sum of the parameters without the first parameter is sixty and the sum without the second parameter is fifteen.

The advertisement assignment application may determine a subset of all parameters where the total parameter score is changed the least and also where the least parameters are removed. Specifically, the advertisement assignment application may determine, based on the different total parameter scores, a configuration of the plurality of parameters from the different configurations that minimizes a change to the total parameter score and minimizes a number of conflict parameters removed from the advertisement assignment model. For example, the advertisement assignment application may select a configuration where the first parameter is removed because the sum of the parameter scores with the first parameter removed constitutes the least change. It should be noted that in some embodiments multiple configurations may be identified where removing different parameters leads to multiple configurations with the same total parameter score. In those instances, the advertisement assignment application may determine a configuration where the least number of parameters are removed. In some embodiments, different configurations may be identified using a feasibility relaxation algorithm for mixed integer linear programs. In some embodiments the advertisement assignment application may minimize the total number of the changes to the advertisement assignment model. Those changes may include both the number of parameters removed and the change in the total parameter score.

The advertisement assignment application may modify the advertisement assignment model based on the determined configuration. Specifically, the advertisement assignment application may modify the advertisement assignment model to remove the at least one conflict parameter from the advertisement assignment model according to the configuration that minimizes the change to the total parameter score and minimizes the number of conflict parameters removed from the advertisement assignment model. For example, the advertisement assignment application may remove the first parameter in the advertisement assignment model exemplified above.

The advertisement assignment application may assign the plurality of advertisements to the plurality of advertisement slots based on the modified advertisement assignment model.

In some embodiments, each parameter may have a system parameter score and a user-defined parameter score. The system parameter scores may be assigned by the entity managing and maintaining the advertisement assignment application while the user-defined parameter scores may be assigned by an advertiser or a user inputting parameters into the advertisement assignment model. The advertisement assignment application may retrieve the parameter score for each parameter of the plurality of parameters by taking the following actions.

The advertisement assignment application may determine which parameters have associated user-defined scores in addition to the system parameter scores. Specifically, the advertisement assignment application may generate a first subset of parameters in the plurality of parameters, where each parameter in the first subset of parameters has an associated user-defined parameter score and a system parameter score. For example, the advertisement assignment application may determine that the first parameter and the third parameter exemplified above have user-defined parameter scores in addition to system parameter scores.

The advertisement assignment application may determine whether each parameter with the user-defined parameter score is configured in such a way that the system parameter score may be overridden by the user-defined parameter score. Specifically, the advertisement assignment application may determine, for each parameter in the first subset of parameters, whether the system parameter score can be overridden by the user-defined parameter score. For example, the advertisement assignment application may determine that the system parameter score for the first parameter can be overridden while the system parameter score for the third parameter cannot be overridden.

The advertisement assignment application may identify parameters with parameter scores that can be overridden and parameters with parameter scores that cannot be overridden. Specifically, the advertisement assignment application may generate a second subset of parameters that includes parameters from the first subset of parameters with system parameter scores that can be overridden, and generate a third subset of parameters that includes parameters from the first subset of parameters that includes system parameter scores that cannot be overridden. For example, the advertisement assignment application may assign the first parameter to one subset and the third parameter to a different subset, based on whether each of the first and third parameters can be overridden.

The advertisement assignment application may retrieve user-defined parameter scores for the second subset and system parameter scores for the third subset. For example, the advertisement assignment application may retrieve the user-defined parameter score for the first parameter and a system parameter score for the second parameter.

In some embodiments, the advertisement assignment application may use a feasibility relaxation algorithm for mixed integer linear programs to determine which configuration to select. Specifically, the advertisement assignment application may, when determining, based on the different total parameter scores, the configuration of the plurality of parameters from the different configurations, execute a feasibility relaxation algorithm for mixed integer linear programs. For example, the advertisement assignment application may transmit the parameters of the advertisement assignment model together with advertisements and advertisement slots to a server executing the algorithm and receive in response different configurations that may be used to place advertisements into advertisement slots without incurring a conflict between parameters.

In some embodiments, the advertisement assignment application may determine the at least one conflict parameter whose removal from the advertisement assignment model causes the conflict to be resolved by performing the following actions. The advertisement assignment application may rank each parameter of the plurality of parameters based on a respective parameter score, where a highest-ranked parameter is associated with a lowest parameter score and the lowest-ranked parameter is associated with the highest parameter score. For example, the advertisement assignment application may be processing an advertisement assignment model with three parameters. The first parameter may have a parameter score of fifty. The second parameter may have a parameter score of ten, and the third parameter may have a parameter score of five. The advertisement assignment application may rank the third parameter highest, the second parameter second highest, and the first parameter lowest.

The advertisement assignment application may select a second plurality of parameters by removing the highest-ranked parameter from the plurality of parameters. To continue the example above, the advertisement assignment application may remove the third parameter from the advertisement assignment model above and select the first and second parameters for the second plurality of parameters.

The advertisement assignment application may compare the second plurality of parameters with parameters of each configuration of the different configurations. For example, the advertisement assignment application may compare the first and second parameters with the parameters of each configuration that resolves the conflict.

The advertisement assignment application may determine whether the second plurality of parameters corresponds to one of the configurations that resolve the conflict. Specifically, the advertisement assignment application may determine, based on comparing the second plurality of parameters with parameters of each configuration of the different configurations, whether the second plurality of parameters matches any configuration of the different configurations. For example, the advertisement assignment application may determine, based on the comparison, whether there is a configuration that resolves the conflict that includes only the first and second parameter.

The advertisement assignment application may, in response to determining that the second plurality of parameters matches a configuration of the different configurations, determine that the at least one conflict parameter is the highest-ranked parameter. To continue with the example above, the second parameter may be determined to be the at least one conflict parameter.

In some embodiments, the advertisement assignment application may, in response to determining that the second plurality of parameters does not match any configuration of the different configurations, select a third plurality of parameters by removing the second highest-ranked parameter from the first plurality of parameters. To continue with the example above, if removing the first and second parameters do not match one of the configurations that resolve the conflict, the advertisement assignment application may select the next highest-ranked parameter (i.e., the second parameter) for removal from the advertisement assignment model.

The advertisement assignment application may select a plurality of parameters without the second highest-ranked parameter. Specifically, the advertisement assignment application may compare the third plurality of parameters with parameters of each configuration of the different configurations. For example, the advertisement assignment application may compare parameters for each configuration that resolves the conflict with the first and third parameters.

The advertisement assignment application may determine that removing the second highest-ranked parameter does not resolve the conflict. The advertisement assignment application may determine, based on comparing the third plurality of parameters with parameters of each configuration of the different configurations, that the third plurality of parameters does not match any configuration of the different configurations (i.e., there is one configuration that resolves the conflict that has only the second highest-ranked parameter removed. For example, the advertisement assignment application may determine that there is no configuration that resolves the conflict that includes only the first parameter and the third parameter.

The advertisement assignment application may remove the two highest-ranked parameters from the advertisement assignment model and determine whether that action resolves the conflict. Specifically, the advertisement assignment application may compare a fourth plurality of parameters with parameters of each of the different configurations, where the fourth plurality of parameters comprises the first plurality of parameters without both the highest-ranked parameter and the second highest-ranked parameter. For example, the advertisement assignment application may remove the third and second parameters and determine whether there is a configuration that matches just the first parameter that resolves the conflict.

The advertisement assignment application may, in response to determining that parameters of any configuration of the different configurations matches the fourth plurality of parameters, determine that the at least one conflict parameter includes the highest-ranked parameter and the second highest-ranked parameter. For example, the advertisement assignment application may determine that the third and second parameters constitute the at least one conflict parameter.

In some embodiments, the advertisement assignment application may determine the configuration of the plurality of parameters from the different configurations that minimizes the change to the total parameter score and minimizes the number of conflict parameters removed from the advertisement assignment model by taking the following actions. The advertisement assignment application may select, from the different configurations, a set of configurations with the lowest change to the total parameter score, and determine, for each configuration in the set of configurations, a number of removed conflict parameters. The advertisement assignment application may select a configuration from the set of configurations with the smallest number of removed conflict parameters. For example, the advertisement assignment application may determine that there are five configurations that have the lowest change in the total parameter score. The advertisement assignment application may determine the number of parameters that were removed, and select the configuration with the lowest number of removed parameters.

In some embodiments, the advertisement assignment application may determine the configuration of the plurality of parameters from the different configurations that minimizes the change to the total parameter score and minimizes the number of conflict parameters removed from the advertisement assignment model by taking the following actions. The advertisement assignment application may select, from the different configurations, a set of configurations with a smallest number of removed conflict parameters, and determine, for each configuration in the set of configurations, a change in a respective total parameter score. The advertisement assignment application may select a configuration from the set of configurations with a smallest change in the respective total parameter score. For example, the advertisement assignment application may determine that there are five configurations that have the lowest change in the total parameter score. The advertisement assignment application may determine a change in a total parameter score for each of the five configurations, and select the configuration with the smallest change in the parameter score.

In some embodiments, the advertisement assignment application may enable the user to override the configuration selected by the system to resolve the conflict. The advertisement assignment application may generate for simultaneous display both the configuration that minimizes the change to the total parameter score and minimizes the number of conflict parameters removed from the advertisement assignment model and an option that enables a user to choose a different configuration that resolves the conflict. The advertisement assignment application may, in response to a user selection of the option, generate for display the different configurations, and in response to a user selection of one of the different configurations, assign the plurality of advertisements to the plurality of advertisement slots based on the user selection of the one of the different configurations. For example, a user may want to override the default configuration that resolves the conflict with another configuration. The advertisement assignment application may provide the user with such a mechanism by presenting to the user an option to do so and when the user selects the option, the advertisement assignment application may enable the user to select the configuration from the different configurations that resolve the conflict that the user desires.

In some embodiments, the advertisement assignment application may determine the at least one conflict parameter whose removal from the advertisement assignment model causes the conflict to be resolved by taking the following actions. The advertisement assignment application may rank each parameter of the plurality of parameters based on a respective parameter score, where a highest-ranked parameter is associated with a lowest parameter score and the lowest-ranked parameter is associated with the highest parameter score. For example, the advertisement assignment application may be processing an advertisement assignment model with three parameters. The first parameter may have a parameter score of fifty. The second parameter may have a parameter score of ten, and the third parameter may have a parameter score of five. The advertisement assignment application may rank the third parameter highest, the second parameter second highest, and the first parameter lowest.

The advertisement assignment application may select the highest-ranked parameter and split it into two parameters. Specifically, the advertisement assignment application may split the highest-ranked parameter into a first sub-parameter and a second sub-parameter. For example, the advertisement assignment application may be processing a parameter that indicates that each of two advertisers must be assigned at least one advertisement slot. The advertisement assignment application may split that parameter into two sub-parameters. The first sub-parameter may indicate that first advertiser one must have at least one advertisement slot and the second sub-parameter may indicate that the second advertiser must have at least one advertisement slot.

The advertisement assignment application may generate a set of parameters that includes the plurality of parameters without the highest-ranked parameter, and simulate the assignment of the plurality of advertisements to the plurality of advertisement slots based on set of parameters and the first sub-parameter. For example, the advertisement assignment application may simulate the assignment of advertisements to advertisement slots with the first sub-parameter, but without the second sub-parameter.

The advertisement assignment application may determine, based on simulating the assignment of the plurality of advertisements to the plurality of advertisement slots based on a set of parameters and the first sub-parameter that there is no conflict that prevents assigning the plurality of advertisements to the plurality of advertisement slots without violating at least one of the first sub-parameter and the set of parameters. For example, the advertisement assignment application may determine that not including the second sub-parameter resolves the conflict. The advertisement assignment application may determine that removal of the highest-ranked parameter and addition of the first sub-parameter resolves the conflict.

The advertisement assignment application may determine whether the highest-ranked parameter can be split into multiple sub-parameters by taking the following actions. The advertisement assignment application may determine whether the highest-ranked parameter is associated with a plurality of advertisers and a plurality of advertisement slots, and simulate splitting the highest-ranked parameter into a plurality of sub-parameters, where each sub-parameter of the plurality of sub-parameters is associated with one advertiser and at least one advertisement slot. The advertisement assignment application may, in response to successfully simulating the splitting, determine that the highest-ranked parameter can be split into multiple parameters. For example, a parameter may indicate that each of three advertisers must be assigned at least one advertisement slot. The advertisement assignment application may determine that the parameter is associated with multiple advertisers. The advertisement assignment application may split the parameter according to each advertiser. Thus, the first sub-parameter may indicate that the first advertiser must have at least one advertisement slot. The second sub-parameter may indicate that the second advertiser must have at least one advertisement slot, and the third sub-parameter may indicate that the third advertiser must have at least one advertisement slot.

DETAILED DESCRIPTION

Systems and methods are described herein for resolving advertisement placement conflicts. Specifically, a number of parameters may be entered into a system in order to place advertisements into advertisement slots. For example, one of the parameters may instruct the system to keep the cost to a specific advertiser under one million dollars for a specific time period. Another parameter may instruct the system to evenly spread the advertisement slots between different advertisers for a specific time period. In many instances, a combination of these parameters causes a conflict in the system where all the parameters cannot be applied in order to place advertisements into advertisement slots. The conflict may be resolved by using an advertisement assignment model to determine which parameters may be relaxed in order to arrive at an optimal solution that violates a smallest number of parameters having the least priority. When such a solution is found, the advertisement assignment model may be modified and advertisements may be placed into advertisement slots based on the modified advertisement assignment model. As referred to herein, the term "advertisement assignment model" refers to a collection of parameters, advertisement slots and advertisements where the parameters may be applied to advertisements and advertisement slots in order to assign advertisements to advertisement slots based on those parameters. In some embodiments, an advertisement assignment model may include other entities (e.g., advertisers). As referred to herein, the term "parameter" refers to one or more criterions for assigning advertisements to advertisement slots. For example, a parameter may indicate that an advertisement associated with a specific advertiser must be assigned an advertisement slot during a particular time.

Figure 1:
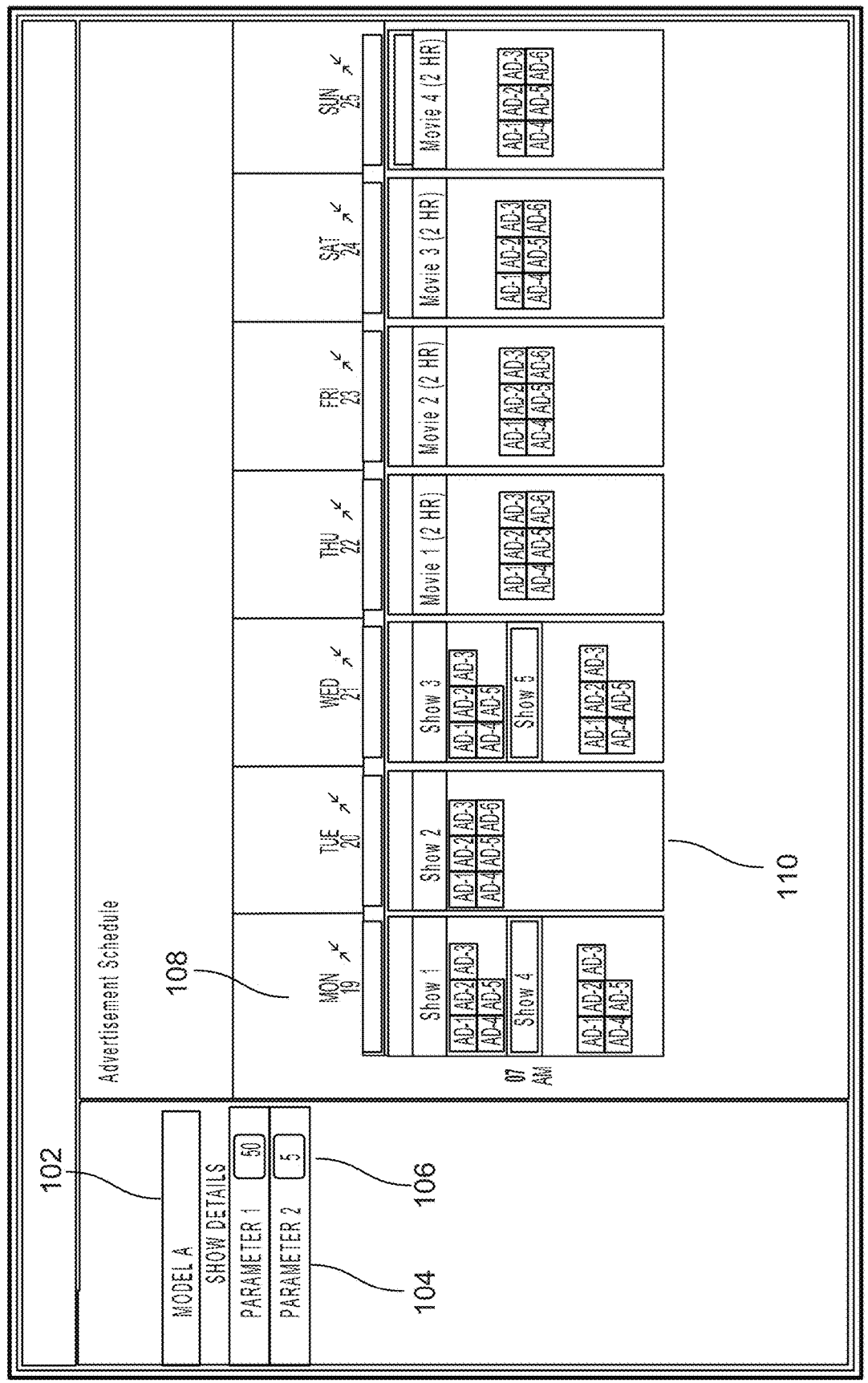
FIG. 1 shows an illustration of a display screen, in accordance with some embodiments of the disclosure.

In some embodiments, control circuitry may implement the actions required to resolve advertisement placing conflicts. The control circuitry may receive multiple parameters with an advertisement assignment model that are to be used to place advertisements into advertisement slots. Specifically, the control circuitry may receive an advertisement assignment model that includes a plurality of parameters that define how a plurality of advertisements should be assigned to a plurality of advertisement slots. For example, FIG. 1 may be used to illustrate an example of one possible advertisement assignment model together with advertisements that are placed into advertisement slots based on the advertisement assignment model. Advertisement assignment model 102 that may include a plurality of parameters 104. Each parameter 104 may be selectable. Upon selection of parameter 104, another display may be generated where the parameter may be modified or removed. New parameters may be added to advertisement assignment model 102 by selecting a space below parameters 2. Each parameter 104 may have an associated parameter score 106. Parameter scores 106 may be displayed next to the corresponding parameter. Advertisement schedule 108 may also be displayed together with the advertisement assignment model. The advertisement schedule may include days of the week on the horizontal axis and times of the day on the vertical axis. Media asset representations 110 may be displayed in the appropriate time slots. Each representation 110 may include a plurality of advertisement slots and each advertisement slot may include an advertisement identifier associated with the respective slot.

The control circuitry may analyze the advertisement assignment model in order to determine whether each parameter may be properly applied, together with the other parameters, when assigning advertisements into available advertisement slots. Specifically, the control circuitry may simulate an assignment of the plurality of advertisements to the plurality of advertisement slots based on the plurality of parameters. For example, the control circuitry may select a first parameter and convert the first parameter into one or more mathematical functions that dictate assignments of advertisements to advertisement slots. The control circuitry may iterate through each parameter to convert those parameters into mathematical functions. These mathematical functions are applied to the advertisements and advertisement slots in order to assign the advertisements to the advertisement slots based on the parameters. When all parameters are applied to the advertisement slots, the control circuitry may generate simulation results.

In some instances, the simulation results may indicate that all parameters may not be applied to the advertisement slots, without violating at least one parameter. Specifically, the control circuitry may determine, based on the simulating, that there is a conflict that prevents assigning the plurality of advertisements to the plurality of advertisement slots without violating a parameter of the plurality of parameters. For example, when the control circuitry iteratively applies the mathematical functions described above to the advertisement slots, an error may be detected such that a certain function cannot be iteratively applied. In one embodiment, an indication of the conflict (not shown) may be added to display 100 in order to inform the user.

The control circuitry may, in response to the determination above, attempt to resolve the conflict. Specifically, the control circuitry may, in response to the determining, retrieve a respective parameter score for each parameter of the plurality of parameters, where each parameter score indicates an importance of the corresponding parameter. The control circuitry may execute a feasibility relaxation algorithm for mixed integer linear programs. As referred to herein, the term "feasibility relaxation algorithm for mixed integer linear programs" refers to a modeling strategy, using linear algebra that iteratively removes, modifies or performs a combination of removing and modifying of one or more parameters from a conflicting set of parameters in order to arrive at a model with no conflicting parameters.

The control circuitry may calculate a total parameter score for the advertisement assignment model based on the retrieved parameter scores. For example, the control circuitry may calculate a sum of all the parameter scores. In some embodiments, parameter scores may be weighted based on the importance of the specific parameter in the specific advertisement assignment model.

The control circuitry may select at least one parameter to modify or remove from the advertisement assignment model by taking the actions described below. The control circuitry may determine at least one conflict parameter, whose removal from the advertisement assignment model causes the conflict to be resolved. In some embodiments, the control circuitry may modify a parameter instead of removing it. For example, if a parameter indicates that a specific advertiser must be assigned at least four advertisement slots, the control circuitry may modify the parameter to indicate that the specific advertiser must be assigned at least three advertisement slots. In some embodiments, the control circuitry may remove some parameters and modify others. For example, the control circuitry may receive, as output from the feasibility relaxation algorithm for mixed integer linear programs, output of different configurations that resolve the conflict. The control circuitry may iterate through each received configuration. For each configuration the control circuitry may compare the parameters of the given configuration with the parameters of the originally received advertisement assignment model. The control circuitry may, based on the comparison, determine which parameters have been removed from each configuration in order to resolve the conflict.

The control circuitry may calculate the parameter scores based on removing one or more parameters to resolve the conflict. Specifically, the control circuitry may calculate a plurality of different total parameter scores based on different configurations of the plurality of parameters in the advertisement assignment model, where each calculated different total parameter score is based on the removal, from the advertisement assignment model, of different ones of the at least one conflict parameter. The control circuitry may iterate through each configuration received from the feasibility relaxation algorithm for mixed integer linear programs and add a score for each parameter that has not been removed as part of the configuration.

The control circuitry may determine a subset of all parameters where the total parameter score is changed the least and also where the least parameters are removed. Specifically, the control circuitry may determine, based on the different total parameter scores, a configuration of the plurality of parameters from the different configurations that minimizes a change to the total parameter score and minimizes a number of conflict parameters removed from the advertisement assignment model. For example, the control circuitry may generate a set of configurations that includes configurations with lowest change in the parameter score. The control circuitry may select a configuration that has the least number of parameters removed.

The control circuitry may modify the advertisement assignment model based on the determined configuration. Specifically, the control circuitry may modify the advertisement assignment model to remove the at least one conflict parameter from the advertisement assignment model according to the configuration that minimizes the change to the total parameter score and minimizes the number of conflict parameters removed from the advertisement assignment model. For example, the control circuitry may compare the parameters of the determined configuration with the parameters of the originally-received advertisement assignment model. Based on the comparison, the control circuitry, may determine which parameters should be removed from the advertisement assign model to resolve the conflict. In another example, the parameter or parameters that have been removed from the configuration may have been stored as part of an action described above. In this example, the control circuitry may retrieve the stored parameter or parameters and use the retrieved information to remove the appropriate parameter or parameters form the advertisement assignment model.

The control circuitry may assign the plurality of advertisements to the plurality of advertisement slots based on the modified advertisement assignment model. It should be noted that, in some embodiments, the control circuitry may, instead of removing one or more parameters, modify one or more parameters in order to resolve the conflict. For example, if a parameter indicates that each advertiser must have at least one advertisement slot and there are three advertisers, the control circuitry may, instead of removing the parameter, modify the parameter to indicate that two of the three advertisers must have at least one advertisement slot.

In some embodiments, each parameter may have a system parameter score and a user-defined parameter score. The system parameter scores may be assigned by the entity managing and maintaining the advertisement assignment application while the user-defined parameter scores may be assigned by an advertiser or a user inputting parameters into the advertisement assignment model. As referred to herein, the term "user-defined parameter score" refers to a parameter score that may be set by a user of the system. It should be noted that in some embodiments an administrator of the system may assign permissions to a specific user or a group of users to assign user-defined parameter scores. As referred herein, the term "system parameter score" refers to a parameter score defined by a system administrator and that cannot be modified by a user. The control circuitry may retrieve the parameter score for each parameter of the plurality of parameters by taking the following actions.

The control circuitry may determine which parameters have associated user-defined scores in addition to the system parameter scores. Specifically, the control circuitry may generate a first subset of parameters in the plurality of parameters, where each parameter in the first subset of parameters has an associated user-defined parameter score and a system parameter score. For example, the control circuitry may retrieve from a database a plurality of entries where each entry is associated with a specific parameter. The control circuitry may store those entries in one or more data structures that can be accessed to retrieve different fields.

The database may be stored locally on the same device where the control circuitry resides or on a remote device. Each entry may include fields for parameter identification (e.g., an alphanumeric number), a system parameter score, a user-defined parameter score, and an indicator of whether the system parameter score can be overridden. Other suitable fields may be included in the entry (e.g., the time the parameter was created).

The control circuitry may determine whether each parameter with the user-defined parameter score is configured in such a way that the system parameter score may be overridden by the user-defined parameter score. Specifically, the control circuitry may determine, for each parameter in the first subset of parameters, whether the system parameter score can be overridden by the user-defined parameter score. For example, the control circuitry may access the one or more data structures described above and retrieve, for each parameter the indicator that indicates whether the system parameter score may be overridden with a user-defined parameter score. In some embodiments, the indicator may be a Boolean where a value of true indicates that the system parameter score may be overridden and the value of false indicates that the system parameter score may not be overridden. In other embodiments, the indicator may be a numeric or an alphanumeric value.

The control circuitry may generate subsets for those parameter scores that can be overridden and for those parameter scores that cannot be overridden. Specifically, the control circuitry may generate a second subset of parameters that includes parameters from the first subset of parameters with system parameter scores that can be overridden, and generate a third subset of parameters that includes parameters from the first subset of parameters that includes system parameter scores that cannot be overridden. For example the control circuitry may create two data structures, one for storing pointers pointing to parameters that have system parameter scores that can be overridden and a second for storing pointers pointing to parameters that have system parameters scores that cannot be overridden.

The control circuitry may retrieve user-defined parameter scores for the second subset and system parameter scores for the third subset. For example, the control circuitry may retrieve from the one or more data structures described above, system parameter scores for the second subset and user-defined parameter scores from the third subset.

In some embodiments, the control circuitry may use a feasibility relaxation algorithm for mixed integer linear programs to determine which configuration to select. Specifically, the control circuitry may, when determining, based on the different total parameter scores, the configuration of the plurality of parameters from the different configurations, execute a feasibility relaxation algorithm for mixed integer linear programs. For example, the control circuitry may transmit the parameters of the advertisement assignment model together with advertisements and advertisement slots to a server executing the algorithm and receive in response different configurations that may be used to place advertisements into advertisement slots without incurring a conflict between parameters.

In some embodiments, the control circuitry may determine the at least one conflict parameter whose removal from the advertisement assignment model causes the conflict to be resolved by performing the following actions. The control circuitry may rank each parameter of the plurality of parameters based on a respective parameter score, where the highest-ranked parameter is associated with the lowest parameter score and the lowest-ranked parameter is associated with the highest parameter score. For example, the control circuitry may iterate through each parameter and retrieve a parameter score associated with each parameter. The control circuitry may sort the parameter scores lowest to highest and rank associated parameters in the same order. The control circuitry may store (e.g., in a data structure) each parameter in the ranked order. For example, the control circuitry may store an identification value associated with each parameter in the data structure. In some embodiments, the control circuitry may store, in the data structure, a pointer to each parameter in the ranked order.

The control circuitry may select a second plurality of parameters by removing the highest-ranked parameter from the plurality of parameters. For example, the control circuitry may generate a data structure that includes all the parameters except the highest ranked parameter. In some embodiments, the data structure may include pointers to other data structures that includes the parameters and metadata associated with the parameters.

The control circuitry may compare the second plurality of parameters with parameters of each configuration of the different configurations. For example, the control circuitry may iterate through each parameter in the plurality of parameters and compare those parameters with parameters of the different configurations. In some embodiments, each parameter may be assigned an identification value (e.g., a numeric string, an alphanumeric string, a binary hash, or another suitable identification). The control circuitry may compare those identification values in order to determine whether the second plurality of parameters matches one of the different configurations. It should be noted that in order for the match to be found, each parameter in the second plurality of parameters must match a parameter in a specific configuration, without other unmatched parameters being present in the specific configuration.

The control circuitry may determine whether the second plurality of parameters corresponds to one of the configurations that resolve the conflict. Specifically, the control circuitry may determine, based on comparing the second plurality of parameters with parameters of each configuration of the different configurations, whether the second plurality of parameters matches any configuration of the different configurations. For example, the control circuitry may determine whether there is a successful comparison with one of the configurations.

The control circuitry may, in response to determining that the second plurality of parameters matches a configuration of the different configurations, determine that the at least one conflict parameter is the highest-ranked parameter. For example, the control circuitry may store one or more parameters that are not part of the determined configuration (i.e., those parameters whose removal causes the conflict to be resolved). In some embodiments, the control circuitry may store pointers to the one or more parameters. In yet other embodiments, the control circuitry may generate a data structure that may store the determined configuration that causes the conflict to be resolved and also stores pointers and/or identifiers of the parameters that were removed from the configuration.

In some embodiments, the control circuitry may, in response to determining that the second plurality of parameters does not match any configuration of the different configurations, select a third plurality of parameters by removing the second highest-ranked parameter from the first plurality of parameters. For example, the control circuitry may access the data structure that stores the ranked parameters and retrieve the next ranked parameter. The control circuitry may generate a data structure for the second plurality that includes identification values for all the parameters except the next ranked parameter.

The control circuitry may compare a plurality of parameters without the second highest-ranked parameter with the different configurations. Specifically, the control circuitry may compare the third plurality of parameters with parameters of each configuration of the different configurations. For example, the control circuitry may iterate through each parameter (e.g., through each parameter identification value) in the third plurality of parameters and compare those values with the parameter identification values associated with parameters for each different configuration that resolves the conflict.

The control circuitry may determine that removing the second highest-ranked parameter does not resolve the conflict. The advertisement assignment application may determine, based on comparing the third plurality of parameters with parameters of each configuration of the different configurations, that the third plurality of parameters does not match any configuration of the different configurations. For example, the control circuitry may determine that none of the different configurations match the third plurality of parameters.

The control circuitry may remove the two highest-ranked parameters from the advertisement assignment model and determine whether that action resolves the conflict. Specifically, the control circuitry may compare a fourth plurality of parameters with parameters of each of the different configurations, where the fourth plurality of parameters comprises the first plurality of parameters without both the highest-ranked parameter and the second highest-ranked parameter. For example, the control circuitry may iterate through each identification value associated with a respective parameter of the fourth plurality of parameters and compare those values with identification values associated with each parameter in each different configuration that resolves the conflict.

The control circuitry may, in response to determining that parameters of any configuration of the different configurations matches the fourth plurality of parameters, determine that the at least one conflict parameter includes the highest-ranked parameter and the second highest-ranked parameter. For example, the control circuitry may determine that there is a configuration that matches the fourth plurality of parameters. It should be noted that in instances where the fourth plurality of parameters doesn't match any different configuration, the control circuitry may continue with the process selecting parameters in ranked order and comparing the different configurations with sets of parameters such that the control circuitry may first compare the set without the selected parameter, then the set without the selected parameter and one of previously selected parameters. Thus the control circuitry may remove one parameter from the set, then iteratively remove all combinations of two parameters, then iteratively remove all combinations of three parameters, and so on.

In some embodiments, the control circuitry may determine the configuration of the plurality of parameters from the different configurations that minimizes the change to the total parameter score and minimizes the number of conflict parameters removed from the advertisement assignment model by taking the following actions. The control circuitry may select, from the different configurations, a set of configurations with the lowest change to the total parameter score, and determine, for each configuration in the set of configurations, a number of removed conflict parameters. The control circuitry may select a configuration from the set of configurations with the smallest number of removed conflict parameters. For example, the control circuitry may iterate through all of the different configurations that resolve the conflict and calculate a total parameter score for each. The control circuitry may calculate the total parameter score by adding all the parameter scores of parameters associated with the given configuration that resolves the conflict. In some embodiments, the control circuitry may have already calculated the total parameter score and may have stored it. In these embodiments, the control circuitry may retrieve a respective total parameter score for each different configuration. The control circuitry may compare the total parameter scores and generate a set of configurations that all have a lowest score. The control circuitry may iterate through each configuration and determine the respective number of parameters that was removed from each configuration. The control circuitry may select the configuration with the least number of parameters removed.

In some embodiments, the control circuitry may determine the configuration of the plurality of parameters from the different configurations that minimizes the change to the total parameter score and minimizes the number of conflict parameters removed from the advertisement assignment model by taking the following actions. The control circuitry may select, from the different configurations, a set of configurations with a smallest number of removed conflict parameters, and determine, for each configuration in the set of configurations, a change in a respective total parameter score. The control circuitry may select a configuration from the set of configurations with a smallest change in the respective total parameter score. For example, the control circuitry may iterate through each configuration and determine the number of parameters that were removed from the respective configuration in order to resolve the conflict. The control circuitry may generate a set of configurations when the lowest number of parameters removed. The control circuitry may calculate, for each configuration in the set, a total parameter score, by adding parameter scores of all parameters in the configuration. In some embodiments, the control circuitry may have already made the calculation and may retrieve the total parameter score associated with each configuration. In yet some embodiments, the control circuitry may calculate the total parameter scores by determining the combined score of the removed parameters for each respective configuration and iteratively subtract for each configuration the combined score from the total parameter score of all the parameters in the advertisement assignment model.

In some embodiments, the control circuitry may enable the user to override the configuration selected by the system to resolve the conflict. The control circuitry may generate for simultaneous display both the configuration that minimizes the change to the total parameter score and minimizes the number of conflict parameters removed from the advertisement assignment model and an option that enables a user to choose a different configuration that resolves the conflict. The control circuitry may, in response to a user selection of the option, generate for display the different configurations, and in response to a user selection of one of the different configurations, assign the plurality of advertisements to the plurality of advertisement slots based on the user selection of the one of the different configurations. For example, a user may want to override the default configuration that resolves the conflict with another configuration. The control circuitry may provide the user with such a mechanism by presenting to the user an option to do so and when the user selects the option, the control circuitry may enable the user to select the configuration from the different configurations that resolve the conflict that the user desires.

In some embodiments, the control circuitry may determine the at least one conflict parameter whose removal from the advertisement assignment model causes the conflict to be resolved by taking the following actions. The control circuitry may rank each parameter of the plurality of parameters based on a respective parameter score, where the highest-ranked parameter is associated with a lowest parameter score and the lowest-ranked parameter is associated with the highest parameter score. For example, the control circuitry may iterate through each parameter and retrieve a parameter score associated with each parameter. The control circuitry may sort the parameter scores lowest to highest and rank associated parameters in the same order. The control circuitry may store (e.g., in a data structure) each parameter in the ranked order. For example, the control circuitry may store an identification value associated with each parameter in the data structure. In some embodiments, the control circuitry may store, in the data structure, a pointer to each parameter in the ranked order.

The control circuitry may select the highest ranked parameter and split it into two parameters. Specifically, the control circuitry may split the highest-ranked parameter into a first sub-parameter and a second sub-parameter. For example, the control circuitry may be processing a parameter that is associated with a plurality of advertisers. The control circuitry may split that parameter into sub-parameters each associated with one advertiser and generate the sub-parameter based on the portion of the parameter that is associated with that advertiser.

The control circuitry may generate a set of parameters that includes the plurality of parameters without the highest-ranked parameter, and simulate the assignment of the plurality of advertisements to the plurality of advertisement slots based on set of parameters and the first sub-parameter. For example, the control circuitry may iterate through each sub-parameter and remove that sub-parameter from the set. The control circuitry may simulate the assignment of advertisements to advertisement slots with each set.

The control circuitry may determine, based on simulating the assignment of the plurality of advertisements to the plurality of advertisement slots based on a set of parameters and the first sub-parameter that there is no conflict that prevents assigning the plurality of advertisements to the plurality of advertisement slots without violating at least one of the first sub-parameter and the set of parameters. For example, the control circuitry may determine a set of parameters (without a specific sub parameter) that resolves the conflict. The control circuitry may determine that removal of the highest-ranked parameter and addition of the first sub-parameter resolves the conflict. For example, the control circuitry may determine a set that resolves the conflict where the set includes parameter without the highest-ranked parameter, but with one or more sub-parameters that were generated above.

The control circuitry may determine whether the highest-ranked parameter can be split into multiple sub-parameters by taking the following actions. The control circuitry may determine whether the highest-ranked parameter is associated with a plurality of advertisers and a plurality of advertisement slots, and simulate splitting the highest-ranked parameter into a plurality of sub-parameters, where each sub-parameter of the plurality of sub-parameters is associated with one advertiser and at least one advertisement slot. The control circuitry may, in response to successfully simulating the splitting, determine that the highest-ranked parameter can be split into multiple parameters. For example, the control circuitry may analyze a specific parameter to determine whether the parameter involves multiple advertisers. The control circuitry may iterate through each advertiser and create a sub-parameter that mirrors the portion of the parameter associated with the specific advertiser. The control circuitry may simulate the splitting and, in response to successful splitting, make the determination that a specific parameter can be split.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
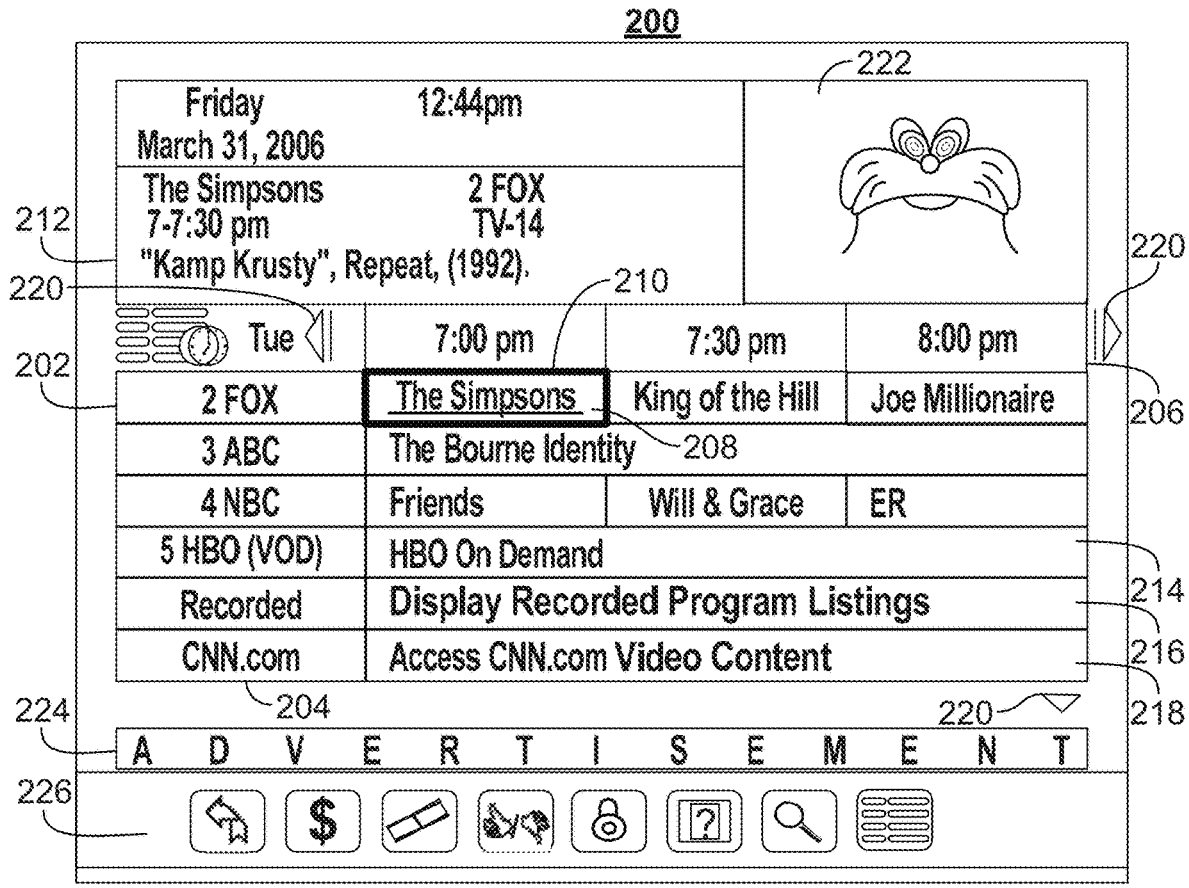
FIG. 2 shows an illustrative embodiment of a display screen that may be used to provide media guidance application listings and other media guidance information, in accordance with some embodiments of the disclosure.
Figure 3:
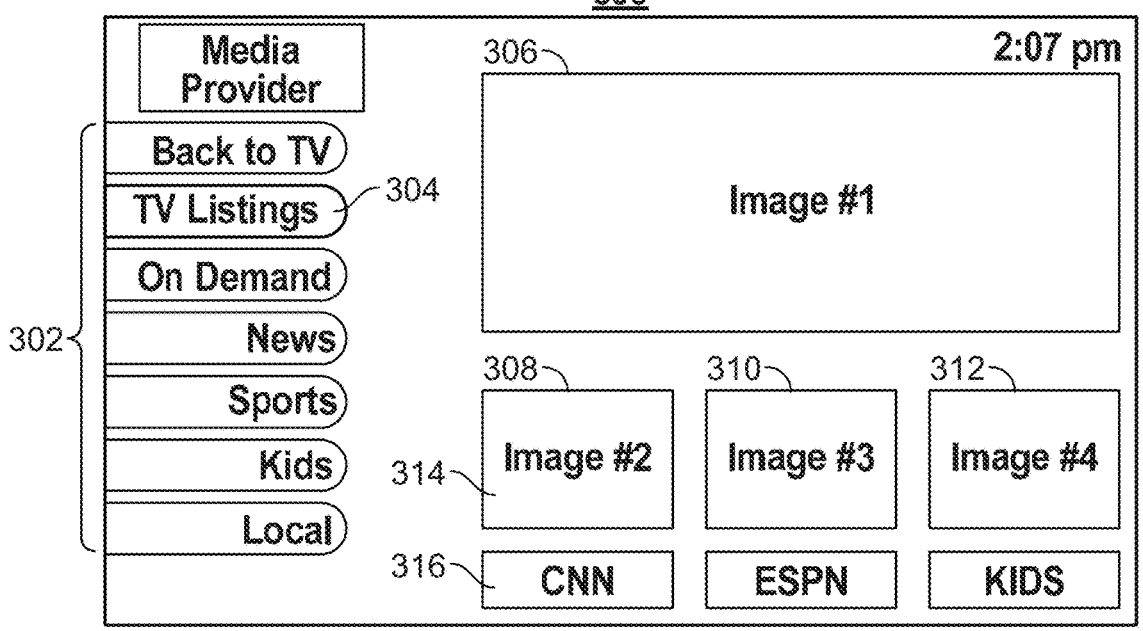
FIG. 3 shows another illustrative embodiment of a display screen that may be used to provide media guidance application listings, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, advertisement 224, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 224 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 202. Advertisement 224 may also be for products or services related or unrelated to the content displayed in grid 202. Advertisement 224 may be selectable and provide further information about content, provide information about a product or a service, enable purchasing of content, a product, or a service, provide content relating to the advertisement, etc. Advertisement 224 may be targeted based on a user's profile/preferences, monitored user activity, the type of display provided, or on other suitable targeted advertisement bases.

While advertisement 224 is shown as rectangular or banner shaped, advertisements may be provided in any suitable size, shape, and location in a guidance application display. For example, advertisement 224 may be provided as a rectangular shape that is horizontally adjacent to grid 202. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

In some embodiments, advertisement 224 may be provided by the advertisement assignment application. The advertisement assignment application may determine, based on the above-described actions, that a specific advertisement during a specific advertisement slot should be displayed as advertisement 224. In some embodiments, the advertisement assignment application may reside on advertisement source 524. The advertisement assignment application may transmit advertisement 224 from the advertisement source 524 to a user device (e.g., user device 502, 504, or 506).

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
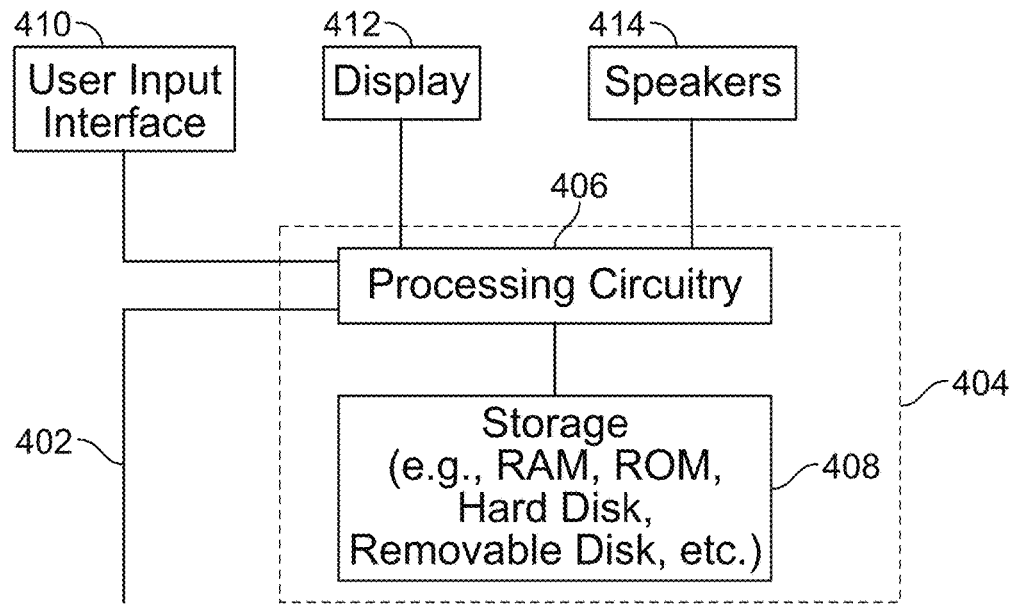
FIG. 4 is a block diagram of an illustrative device, in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
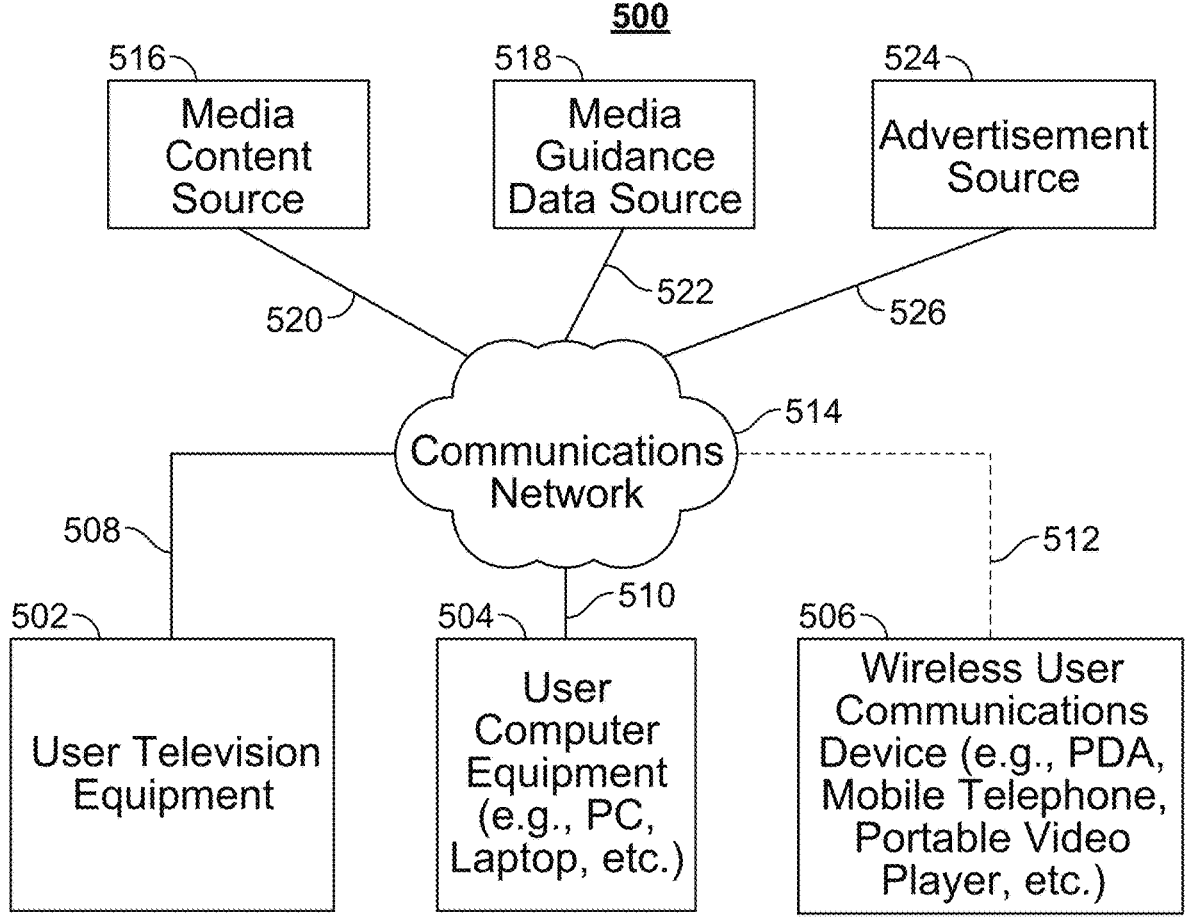
FIG. 5 is a block diagram of an illustrative media system, in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some user television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

System 500 may also include an advertisement source 524 coupled to communications network 514 via a communications path 526. Path 526 may include any of the communication paths described above in connection with paths 508, 510, and 512. Advertisement source 524 may include an advertisement assignment application that may transmit advertisements to specific users and under specific circumstances. For example, a cable operator may have the right to insert advertisements during specific time slots on specific channels. Thus, advertisement source 524 may transmit advertisements to users during those time slots.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
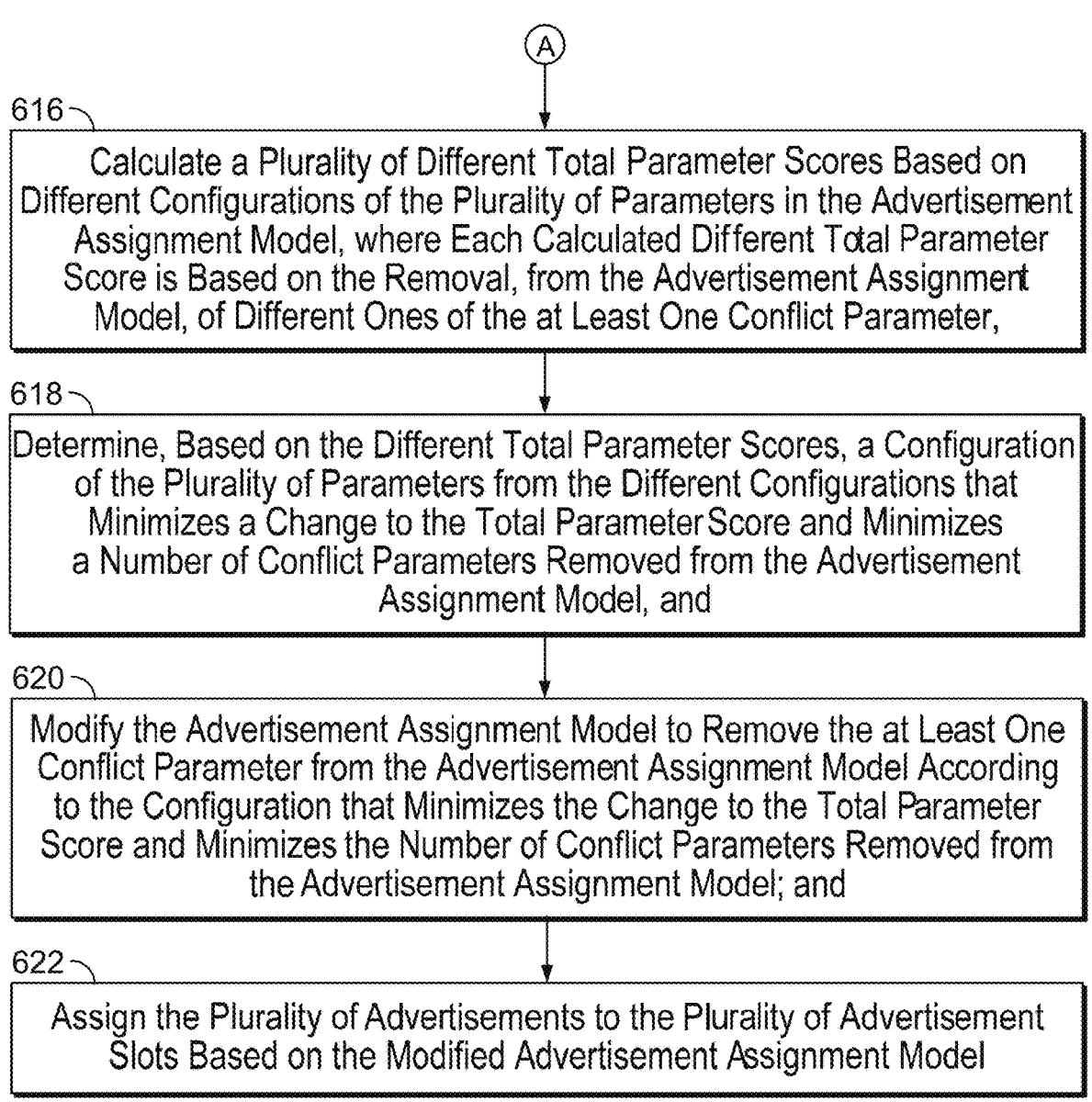
FIG. 6 depicts an illustrative process for resolving advertisement placement conflicts, in accordance with some embodiments of this disclosure.

FIG. 6 illustrates process 600 that may be used to resolve advertisement placement conflicts. At 602, control circuitry 404 receives an advertisement assignment model that includes a plurality of parameters that define how a plurality of advertisements should be assigned to a plurality of advertisement slots. Control circuitry 404 may reside on any of user television equipment 502, user computer equipment 504, and wireless user communications device 506. In some embodiments, control circuitry 404 may reside on a server (e.g., a server associated with media content source 516, media guidance data source 518 and/or advertisement source 524). Control circuitry 404 may receive the advertisement model from user input interface 410. At 604, control circuitry 404 simulates an assignment of the plurality of advertisements to the plurality of advertisement slots based on the plurality of parameters. Control circuitry 404 may perform the simulation itself or may transmit (e.g., through communications network 514) the advertisement assignment model to a remote server (e.g., a server associated with media content source 516, media guidance data source 518, or advertisement source 524).

At 606, control circuitry 404 determines, based on the simulating, that there is a conflict that prevents assigning the plurality of advertisements to the plurality of advertisement slots without violating a parameter of the plurality of parameters. Control circuitry 404 may make the determination by applying parameters to the advertisement slots as described above. In some embodiments, control circuitry 404 may receive, from a remote server (e.g., a server located at media content source 516, media guidance data source 518, or advertisement source 524), simulation results with data describing identified conflicts.

At 608, the control circuitry, in response to the determining, retrieves a respective parameter score for each parameter of the plurality of parameters, where each parameter score indicates an importance of the corresponding parameter. The control circuitry may retrieve the plurality of parameters from a database, as described above. The database may reside locally in storage 408 or on a remote server (e.g., a server associated with media content source 516, media guidance data source 518, or advertisement source 524). Control circuitry 404 may retrieve the parameters by transmitting a query to the database, and receive from the database the required information.

At 610, control circuitry 404 calculates a total parameter score for the advertisement assignment model based on the retrieved parameter scores. For example, control circuitry 404 may calculate a mathematical sum of all parameter scores. In some embodiments, the parameter scores may be weighted. In those embodiments, the control circuitry may calculate the total parameter score taking into account weights of each parameter score.

At 612, control circuitry 404 selects at least one parameter to remove from the advertisement assignment model taking the following actions. At 614, control circuitry 404 determines at least one conflict parameter whose removal from the advertisement assignment model causes the conflict to be resolved. Control circuitry 404 may execute a feasibility relaxation module to determine different combinations of parameters that may be removed from the advertisement assignment model in order to resolve the conflict. In some embodiments, control circuitry 404 may transmit (e.g., over communications network 514) the advertisement assignment model to a remote server (e.g., a server associated with media content source 516, media guidance data source 518, or advertisement source 524) in order to make the identification.

At 616, control circuitry 404 calculates a plurality of different total parameter scores based on different configurations of the plurality of parameters in the advertisement assignment model, where each calculated different total parameter score is based on the removal, from the advertisement assignment model, of different ones of the at least one conflict parameter. The control circuitry may create a data structure for each possible configuration and store the different parameters that have not been removed from the configuration in the data structures. The control circuitry may calculate a sum, or, in some embodiments, a weighted sum, of all parameter scores. The data structure may reside locally (e.g., in storage 408) or at a remote server (e.g., a server associated with media content source 516, media guidance data source 518, and/or advertisement source 524).

At 618, control circuitry 404 determines, based on the different total parameter scores, a configuration of the plurality of parameters from the different configurations that minimizes a change to the total parameter score and minimizes a number of conflict parameters removed from the advertisement assignment model. The control circuitry may determine a sum that is the least changed from the total parameter score and use the configuration associated with that sum. If multiple configurations are determined, based on the sums, that are closest in value to the total parameter score, the configuration that requires the least number of parameter removals is selected.

At 620, control circuitry 404 modifies the advertisement assignment model to remove the at least one conflict parameter from the advertisement assignment model according to the configuration that minimizes the change to the total parameter score and minimizes the number of conflict parameters removed from the advertisement assignment model. For example, control circuitry 404 may select a data structure that includes a configuration with the sum, or in some embodiments a weighted sum, closest in value to the total parameter score and replaces the parameters in the advertisement assignment model with parameters in the configuration data structure.

At 622, control circuitry 404 assigns the plurality of advertisements to the plurality of advertisement slots based on the modified advertisement assignment model. Control circuitry 404 may perform the assignments in a similar manner to performing the simulation, but instead actually transmit the assignment information to the advertisement system (e.g., the advertisement system located at advertisement source 524).

Figure 7:
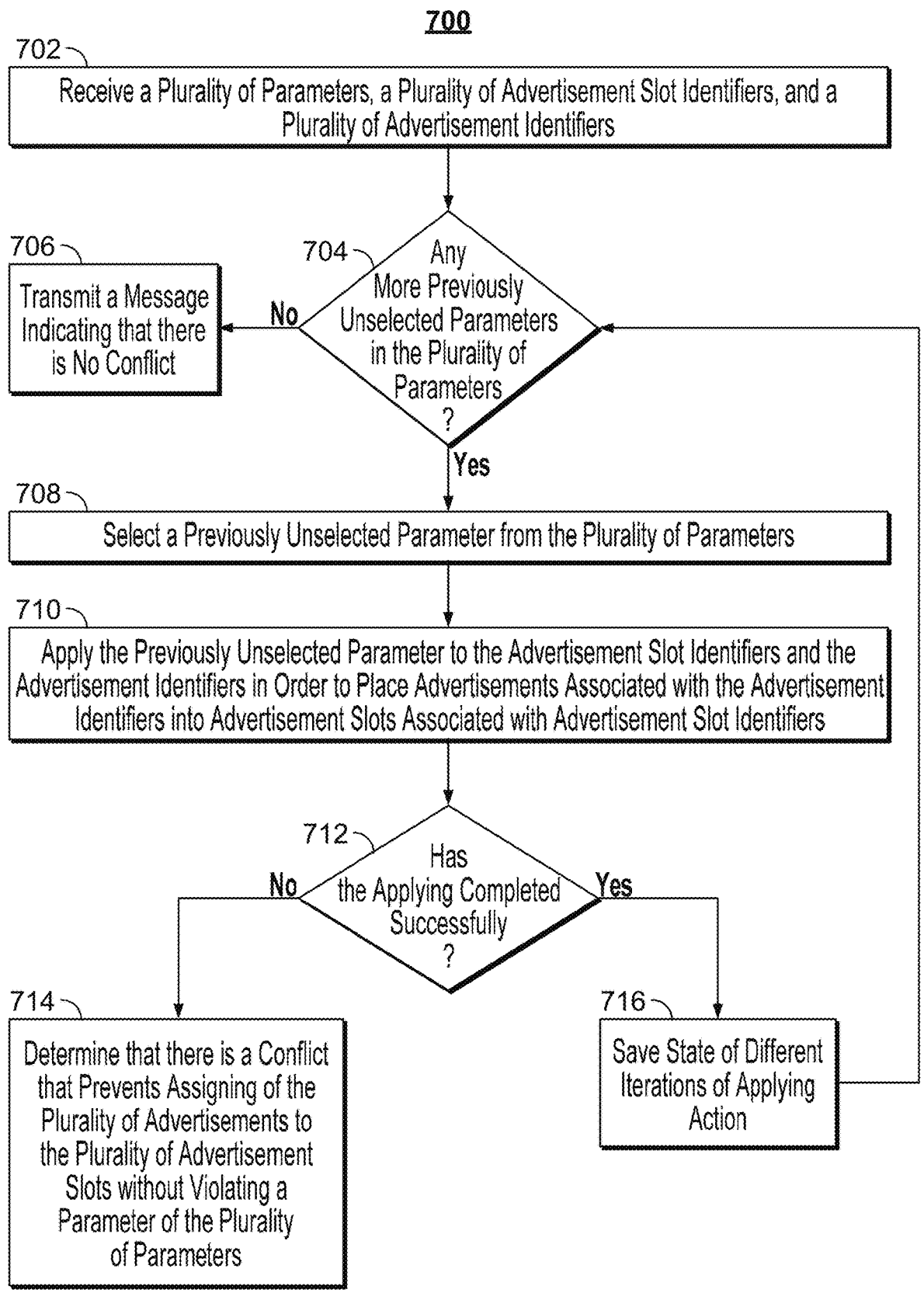
FIG. 7 depicts an illustrative process for determining whether parameters of the advertisement assignment model cause a conflict, in accordance with some embodiments of this disclosure.

FIG. 7 depicts an illustrative process for determining whether parameters of the advertisement assignment model cause a conflict, in accordance with some embodiments of this disclosure. At 702, control circuitry 404 receives a plurality of parameters, a plurality of advertisement slot identifiers, and a plurality of advertisement identifiers. The control circuitry may receive (e.g., via I/O path 402) the plurality of parameters, the plurality of advertisement slots, and a plurality of advertisement identifiers from any of media content source 516, media guidance data source 518 and advertisement source 524.

At 704, control circuitry 404 may determine whether there are any more previously unselected parameters in the plurality of parameters. For example, control circuitry 404 may store all parameters to be processed in a data structure. The control circuitry may iterate through all the parameters selecting one parameter at a time for processing. During the first iteration there will be unselected parameters. However, after the first iteration, an iteration may be reached when all the parameters may be processed. This signifies that all parameters were successfully applied. Thus, if all parameters were previously selected, process 700 moves to 706, where the control circuitry transmits (e.g., via I/O path 402) a message indicating that there is no conflict.

If there are more previously unselected parameters, process 700 moves to action 708. At 708, the control circuitry selects a previously unselected parameter from the plurality of parameters. As exemplified above, the control circuitry may store the plurality of parameters in a data structure (e.g., in storage 408). In some embodiments, the control circuitry may store each parameter in a plurality of parameters in a data structure and generate another data structure with pointers to each parameter data structure. The control circuitry may maintain a record of all parameters that have previously been selected and select a previously unselected parameter by moving a pointer within a data structure to the next parameter to be processed.

At 710, control circuitry 404 applies the previously unselected parameter to the advertisement slot identifiers and the advertisement identifiers in order to place advertisements associated with the advertisement identifiers into advertisement slots associated with advertisement slot identifiers. If the previously unselected parameter is the first parameter, the control circuitry may apply the parameter. However, if the previously unselected parameter is not the first parameter selected, the control circuitry may retrieve (e.g., from storage 408) a saved state of different iterations of the applying action and apply the current parameter to the saved state. It should be noted that the saved state may be retrieved from a remote server (e.g., a server associated with media content source 516, media guidance data source 518 and/or advertisement source 524). When the control circuitry attempts to apply the previously unselected parameter to place advertisements into advertisement slots, the control circuitry may transform the parameters into mathematical terms (e.g., a parameter may be associated with a number of time slots that is needed to satisfy the parameter). The control circuitry may retrieve from the saved state a number of advertisement slots that are available. If the number of advertisement slots available is greater than or equal to the number of advertisement slots required by the transformed parameter, the control circuitry may assign the appropriate number of advertisement slots to the parameter and save (e.g., in storage 408) the state. The control circuitry may generate a success code for the operation if the required advertisement slots were available. If the number of advertisement slots available is less than what is required by the transformed parameter, the control circuitry may generate a failure code or an error code. In some embodiments, the control circuitry may generate metadata related to the failure (e.g., parameter that caused the error, the number of advertisement slots that are needed to apply the parameter successfully, and other suitable metadata). The control circuitry may store the failure or success code along with metadata in storage 408 or at a remote server (e.g., a server associated with media content source 516, media guidance data source 518, and/or advertisement source 524).

At 712, the control circuitry determines whether the applying step has completed successfully. For example, the control circuitry may retrieve the success or failure code and the associated metadata to determine whether the retrieve code corresponds to success or failure. If the applying has not completed successfully, process 700 moves to step 714, where control circuitry 404 determines that there is a conflict that prevents assigning of the plurality of advertisements to the plurality of advertisement slots without violating a parameter of the plurality of parameters. For example, if the retrieved code corresponds to a failure code, the control circuitry may determine that there is a conflict. The control circuitry may store the determination as an error code or transmit the error code to another routine.

If the control circuitry determines that the applying has completed successfully, process 700 moves to step 716, where the control circuitry saves the state of different iterations of the applying action, including the latest iteration. Process 700 then moves to action 704, where the control circuitry again determines whether there are any more previously unselected parameters.

Figure 8:
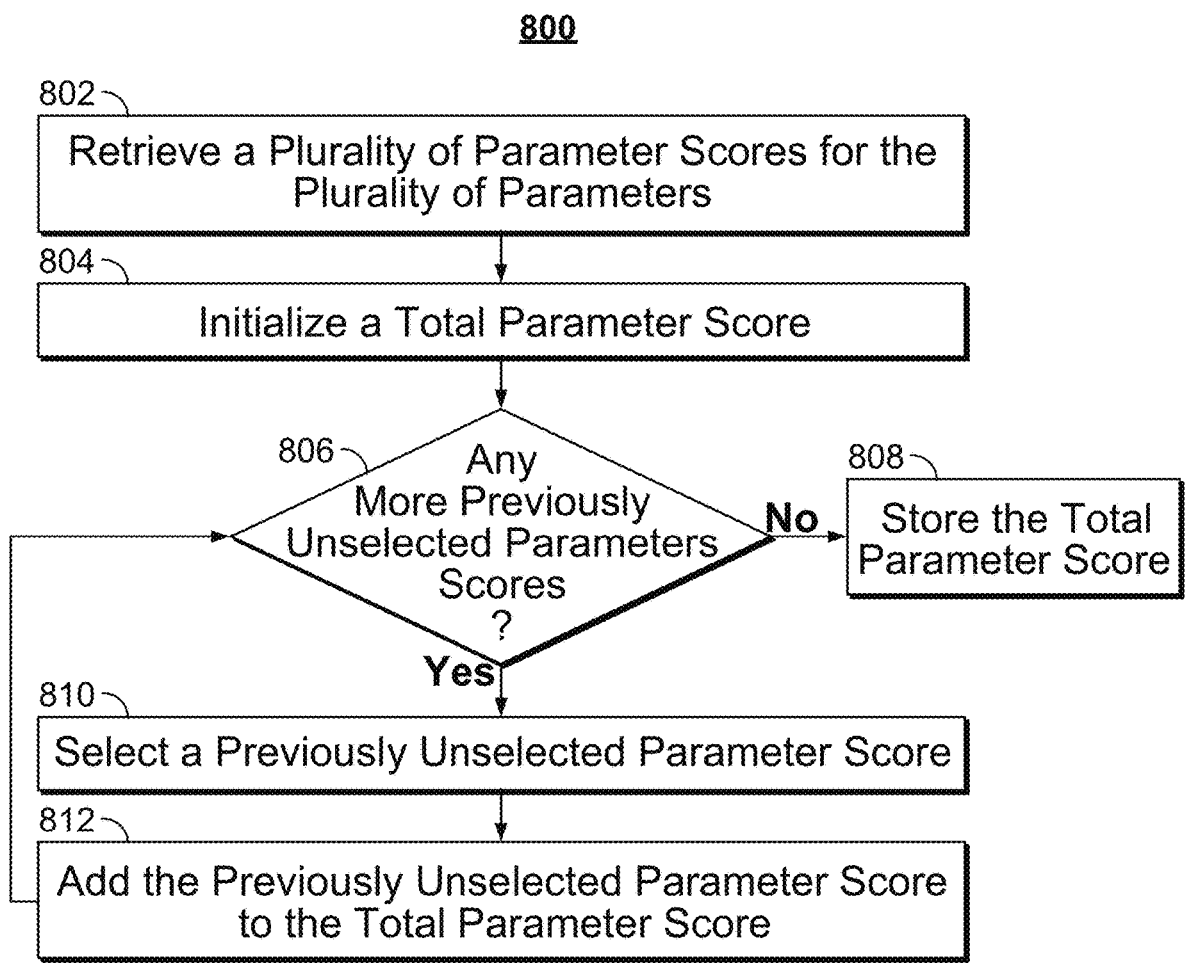
FIG. 8 depicts an illustrative process for calculating a total parameter score, in accordance with some embodiments of this disclosure.

FIG. 8 depicts an illustrative process for calculating a total parameter score. At 802, control circuitry 404 retrieves a plurality of parameter scores for the plurality of parameters. The control circuitry may retrieve the parameter scores from storage 408. In some embodiments, the control circuitry may retrieve the parameter scores from a remove server (e.g., a server associated with media content source 516, media guidance data source 518, and/or advertisement source 524). At 804, control circuitry 404 initializes a total parameter score. For example, the control circuitry may instantiate a variable to be used for the total parameter score and store the variable in storage (e.g., storage 408) to be accessed at a later time.

At 806, control circuitry 404 determines whether there are any more previously unselected parameter scores. The control circuitry may generate a data structure for all parameter scores and maintain a record of all the parameters that have been previously selected. The control circuitry may determine based on the record whether all parameter scores have been selected. If all parameter scores have previously been selected, process 800 moves to 808, where control circuitry 404 stores (e.g., in storage 408) the total parameter score. If all parameter scores have not yet been previously selected, process 800 moves to 810 where control circuitry 404 selects a previously unselected parameter score. For example, the control circuitry may retrieve from the data structure storing all parameter scores a parameter score that has not been yet been selected based on the record.

At 812, control circuitry 404 adds the previously unselected parameter score to the total parameter score. Process 800 then moves to action 806 and continues onward until all parameters have been processed (i.e., selected).

Figure 9:
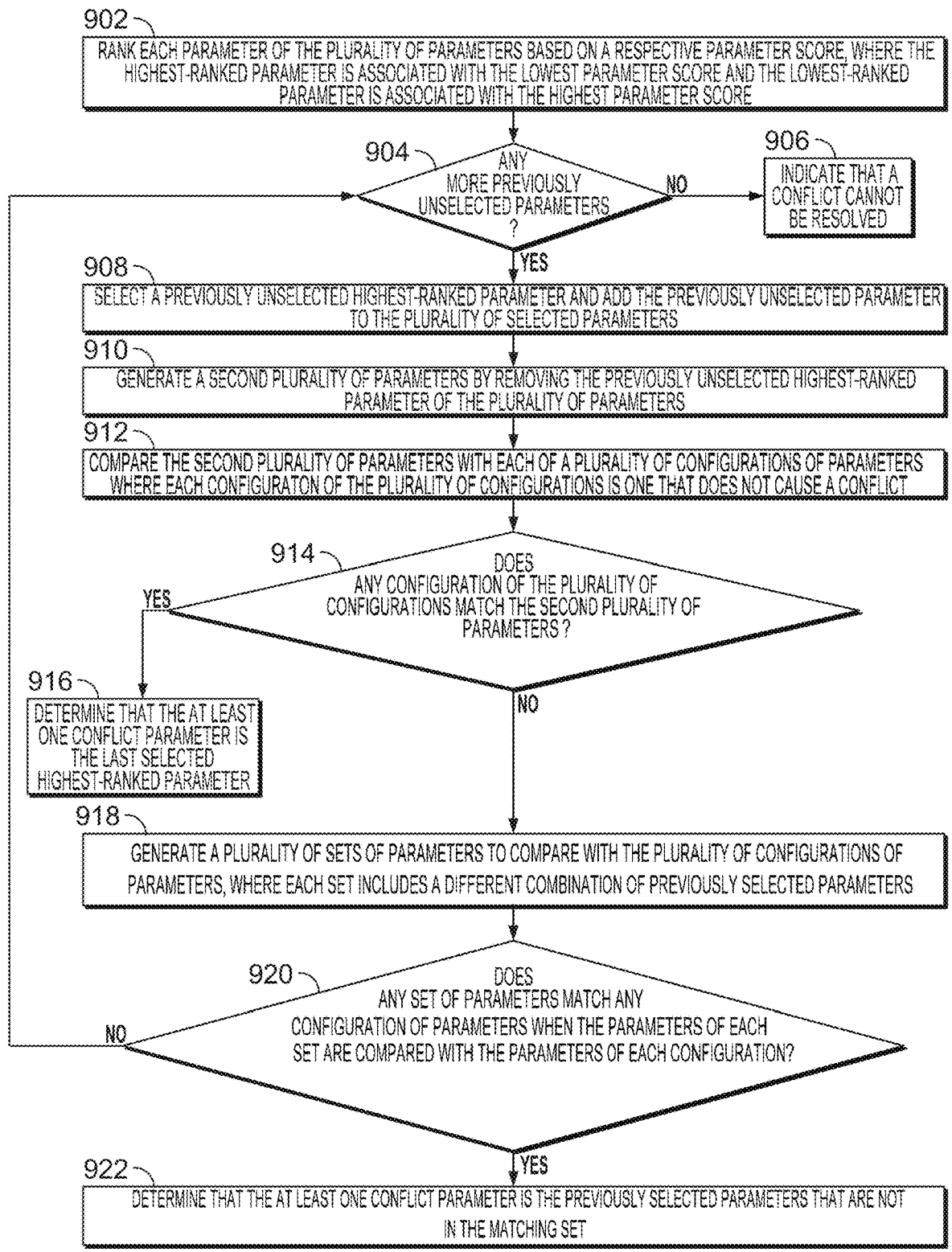
FIG. 9 depicts an illustrative process for determining one or more conflict parameters whose removal from the advertisement assignment model resolves the conflict.

FIG. 9 depicts an illustrative process for determining one or more conflict parameters whose removal from the advertisement assignment model resolves the conflict. At 902, control circuitry 404 ranks each parameter of the plurality of parameters based on a respective parameter score, where the highest-ranked parameter is associated with a lowest parameter score and the lowest-ranked parameter is associated with the highest parameter score. For example, the control circuitry may iterate through each parameter and retrieve for each parameter a corresponding parameter score. The control circuitry may compare each retrieved parameter score to other previously retrieved parameter scores and place the retrieved parameter score in order.

At 904, control circuitry 404 determines whether there are any more previously unselected parameters. For example, the control circuitry may be maintaining a record of all parameters that have been previously selected. All parameters that have been previously selected are those parameters that have been compared to different configurations of parameters that resolve the conflict and the previous comparisons have not been successful. Thus, if all parameters have been previously selected, the result is that the conflict cannot be resolved. Therefore, process 900 moves to 906, where control circuitry 404 indicates that a conflict cannot be resolved. For example, the control circuitry may generate for display a notification to a user that the conflict cannot be resolved. In some embodiments, the control circuitry may transmit a message to a user or users in the form of an email or another suitable format indicating that the conflict cannot be resolved.

However, if there are more previously unselected parameters, process 900 moves to 908, where control circuitry 404 selects a previously unselected highest-ranked parameter and adds the previously unselected parameters to the plurality of selected parameters. For example, the control circuitry may access a data structure that stores the parameters in the ranked order and retrieve the highest-ranked parameter that has not been selected yet. The control circuitry may mark the parameter selected by updating a field in the data structure (e.g., a Boolean from false to true, or vice versa).

At 910, control circuitry 404 generates a second plurality of parameters by removing the previously unselected highest-ranked parameter of the plurality of parameters. The control circuitry may generate a data structure and place into the data structure each parameter or a pointer to each parameter, without place into the data structure the currently selected parameter. The control circuitry may store the data structure in storage 408 or at a remote server (e.g., a server associated with media content source 516, media guidance data source 518, or advertisement source 524).

At 912, control circuitry 404 compares that second plurality of parameters with each of a plurality of configurations of parameter, where each configuration of the plurality of configurations is one that does not cause a conflict. For example, the control circuitry may compare identification values associated with each parameter in order to determine whether two parameters (one from a specific configuration and one from the second plurality of parameters) match. The control circuitry may iterate through each configuration in order to determine whether any configuration matches the second plurality of parameters (i.e., where a configuration includes parameters identical to the second plurality of parameters).

At 914, control circuitry 404 determines whether any configuration of the plurality of configurations matches the second plurality of parameters. The control circuitry may make the configuration based on the comparison at 912. If a configuration of the plurality of configurations matches the second plurality of parameters, process 900 moves to 916, where control circuitry 404 determines that the at least one conflict parameters is the last selected highest-ranked parameter. If no configuration of the plurality of configurations matches the second plurality of parameters, process 900 moves to 918.

At 918, control circuitry 404 generates a plurality of sets of parameters to compare with the plurality of configurations of parameters, where each set includes a different combination of previously selected parameters. The control circuitry may access a data structure that stores all parameters and identify parameters that have been previously selected. The control circuitry may generate a data structure for each different combination of previously selected parameters. For example, if the first, second, and third parameters were previously selected, the control circuitry may generate a first data structure for the first parameter and the second parameter, a second data structure for the first and third parameter, a third data structure for the second and third parameter, and a fourth data structure for the first, second, and third parameters. The control circuitry may place into the data structure all the parameters and then remove the parameters in the corresponding combination. The control circuitry may compare each data structure with each configuration of parameters that resolves the conflict in order to determine whether parameters in one of the sets match the parameters of one of the configurations.

At 920, control circuitry 404 determines whether any set of parameters matches any configuration of parameters when the parameters of each set are compared with the parameters of each configuration. If the control circuitry determines that a set of parameters matches a configuration of parameters when the parameters of each set are compared with the parameters of each configuration process 900 moves to 922. At 922, control circuitry 404 determines that the at least one parameter is the previously selected parameters that are not in the matching set. For example, the control circuitry may store (e.g., in storage 408) sets generated above together with the corresponding combinations. The control circuitry may access the parameters of the corresponding combination and identify those parameters as the at least one conflict parameter. If the control circuitry determines that no set of parameters matches a configuration of parameters when the parameters of each set are compared with the parameters of each configuration process 900 moves to 904 where it proceeds as described above.

It is contemplated that the steps or descriptions of FIGS. 6-10 may be used with any other embodiment of this disclosure. In addition, the steps and descriptions described in relation to FIG. 6-10 may be done in alternative orders or in parallel to further the purposes of this disclosure. For example, each of these steps may be performed in any order or in parallel or substantially simultaneously to reduce lag or increase the speed of the system or method.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for resolving advertisement placement conflicts, the method comprising:

accessing, at an advertisement placement server configured to communicate with a user device, a proposed assignment of a plurality of advertisements to a plurality of advertisement slots;

accessing, at the advertisement placement server, a plurality of parameters defining a preferred advertisement assignment;

determining, by the advertisement placement server, based on the proposed assignment, whether there is a conflict that prevents assigning the plurality of advertisements to the plurality of advertisement slots without violating a parameter of the plurality of parameters;

in response to determining, at the advertisement placement server, that there is a conflict:

generating, by the advertisement placement server, a plurality of different configurations of the plurality of parameters by iteratively removing one or more of the plurality of parameters using a feasibility relaxation algorithm for mixed integer linear programs;

selecting, by the advertisement placement server, one of the plurality of different configurations that violates a smallest number of parameters and minimizes a number of conflict parameters removed from the plurality of parameters; and modifying, by the advertisement placement server, the plurality of parameters according to the selected configuration; and assigning, by the advertisement placement server, the plurality of advertisements to the plurality of advertisement slots based on the modified plurality of parameters.

2. The method of claim 1 further comprising accessing a parameter score for each parameter of the plurality of parameters by:

retrieving, at the advertisement placement server, a parameter score for each parameter of the plurality of parameters;

generating, by the advertisement placement server, a first subset of parameters in the plurality of parameters, wherein each parameter in the first subset of parameters has an associated user-defined parameter score and a system parameter score;

determining, by the advertisement placement server, for each parameter in the first subset of parameters, whether the system parameter score can be overridden by the user-defined parameter score;

generating, by the advertisement placement server, a second subset of parameters that includes parameters from the first subset of parameters with system parameter scores that can be overridden;

generating, by the advertisement placement server, a third subset of parameters that includes parameters from the first subset of parameters with system parameter scores that cannot be overridden; and retrieving, at the advertisement placement server, user-defined parameter scores for the second subset and system parameter scores for the third subset.

3. The method of claim 1, further comprising determining at least one conflict parameter whose removal from the plurality of parameters causes the conflict to be resolved by:

ranking, by the advertisement placement server, each parameter of the plurality of parameters based on a respective parameter score, wherein a highest-ranked parameter is associated with a lowest parameter score and a lowest-ranked parameter is associated with a highest parameter score;

selecting, by the advertisement placement server, a second plurality of parameters by removing the highest-ranked parameter from the plurality of parameters;

comparing, by the advertisement placement server, the second plurality of parameters with parameters of each configuration of the different configurations;

determining, at the advertisement placement server, based on comparing the second plurality of parameters with parameters of each configuration of the different configurations, whether the second plurality of parameters matches any configuration of the different configurations; and in response to determining that the second plurality of parameters matches a configuration of the different configurations, determining, by the advertisement placement server, that the at least one conflict parameter is the highest-ranked parameter.

4. The method of claim 3, further comprising:

in response to determining, by the advertisement placement server, that the second plurality of parameters does not match any configuration of the different configurations, selecting, by the advertisement placement server, a third plurality of parameters by removing a second highest-ranked parameter from the a plurality of parameters;

comparing, by the advertisement placement server, the third plurality of parameters with parameters of each configuration of the different configurations;

determining, by the advertisement placement server, based on comparing the third plurality of parameters with parameters of each configuration of the different configurations, that the third plurality of parameters does not match any configuration of the different configurations;

comparing, by the advertisement placement server, a fourth plurality of parameters with parameters of each of the different configurations, wherein the fourth plurality of parameters comprises the first plurality of parameters without both the highest-ranked parameter and the second highest-ranked parameter; and in response to determining, by the advertisement placement server, that parameters of any configuration of the different configurations matches the fourth plurality of parameters, determining, by the advertisement placement server, that the at least one conflict parameter includes the highest-ranked parameter and the second highest-ranked parameter.

5. The method of claim 1 wherein selecting one of the plurality of different configurations that violates the smallest number of parameters and minimizes a number of conflict parameters removed from the plurality of parameters further comprises:

selecting, by the advertisement placement server, from the different configurations, a set of configurations with the lowest change to a total parameter score;

determining, by the advertisement placement server, for each configuration in the set of configurations, a number of removed conflict parameters; and selecting, by the advertisement placement server, a configuration from the set of configurations with the smallest number of removed conflict parameters.

6. The method of claim 1, wherein selecting one of the plurality of different configurations that violates the smallest number of parameters and minimizes a number of conflict parameters removed from the plurality of parameters further comprises:

selecting, by the advertisement placement server, from the different configurations, a set of configurations with a smallest number of removed conflict parameters;

determining, by the advertisement placement server, for each configuration in the set of configurations, a change in a respective total parameter score; and selecting, by the advertisement placement server, a configuration from the set of configurations with a smallest change in the respective total parameter score.

7. The method of claim 1, further comprising determining, by the advertisement placement server, at least one conflict parameter whose removal from the plurality of parameters causes the conflict to be resolved by:

ranking, by the advertisement placement server, each parameter of the plurality of parameters based on a respective parameter score, wherein the highest-ranked parameter is associated with a lowest parameter score and the lowest-ranked parameter is associated with the highest parameter score;

splitting, by the advertisement placement server, the highest-ranked parameter into a first sub-parameter and a second sub-parameter;

generating, by the advertisement placement server, a set of parameters that includes the plurality of parameters without the highest-ranked parameter;

simulating, by the advertisement placement server, the assignment of the plurality of advertisements to the plurality of advertisement slots based on set of parameters and the first sub-parameter;

determining, by the advertisement placement server, based on simulating the assignment of the plurality of advertisements to the plurality of advertisement slots based on a set of parameters and the first sub-parameter that there is no conflict that prevents assigning the plurality of advertisements to the plurality of advertisement slots without violating at least one of the first sub-parameter and the set of parameters; and determining, by the advertisement placement server, that removal of the highest-ranked parameter and addition of the first sub-parameter resolves the conflict.

8. The method of claim 7, further comprising determining, by the advertisement placement server, whether the highest-ranked parameter can be split into multiple sub-parameters by:

determining, by the advertisement placement server, whether the highest-ranked parameter is associated with a plurality of advertisers and a plurality of advertisement slots;

simulating, by the advertisement placement server, splitting the highest-ranked parameter into a plurality of sub-parameters, wherein each sub-parameter of the plurality of sub-parameters is associated with one advertiser and at least one advertisement slot; and in response to successfully simulating, by the advertisement placement server, the splitting, determining, by the advertisement placement server, that the highest-ranked parameter can be split into multiple parameters.

9. The method of claim 1, wherein the accessing, by the advertisement placement server, a plurality of parameters defining preferred advertisement assignment further comprises receiving, by the advertisement placement server, the plurality of parameters via a network.

10. The method of claim 1, further comprising calculating, by the advertisement placement server, a plurality of different total parameter scores based on the plurality of different configurations of the plurality of parameters, wherein each calculated different total parameter score is based on the removal from the plurality of parameters, or modification within the plurality of parameters, of different ones of the at least one conflict parameter.

11. A system for resolving advertisement placement conflicts, the system comprising:

output circuitry; and
control circuitry configured to:
access a proposed assignment of a plurality of advertisements to a plurality of advertisement slots;
access a plurality of parameters defining preferred advertisement assignment;
determining, based on the proposed assignment, whether there is a conflict that prevents assigning the plurality of advertisements to the plurality of advertisement slots without violating a parameter of the plurality of parameters;
in response to determining that there is a conflict:
generate a plurality of different configurations of the plurality of parameters by iteratively removing or modifying one or more of the plurality of parameters using a feasibility relaxation algorithm for mixed integer linear programs;
select one of the plurality of different configurations from the subset of different configurations that violates a smallest number of parameters and minimizes a number of conflict parameters removed from the plurality of parameters; and
modify the plurality of parameters according to the selected configuration; and
assign the plurality of advertisements to the plurality of advertisement slots based on the plurality of parameters.

12. The system of claim 11, wherein the control circuitry is further configured to access a parameter score for each parameter of the plurality of parameters by:

generating a first subset of parameters in the plurality of parameters, wherein each parameter in the first subset of parameters has an associated user-defined parameter score and a system parameter score;

determining, for each parameter in the first subset of parameters, whether the system parameter score can be overridden by the user-defined parameter score;

generating a second subset of parameters that includes parameters from the first subset of parameters with system parameter scores that can be overridden;

generating a third subset of parameters that includes parameters from the first subset of parameters with system parameter scores that cannot be overridden; and retrieving user-defined parameter scores for the second subset and system parameter scores for the third subset.

13. The system of claim 11, wherein the control circuitry is further configured to determine at least one conflict parameter whose removal from the plurality of parameters causes the conflict to be resolved by:

ranking each parameter of the plurality of parameters based on a respective parameter score, wherein a highest-ranked parameter is associated with a lowest parameter score and a lowest-ranked parameter is associated with a highest parameter score;

selecting a second plurality of parameters by removing the highest-ranked parameter from the plurality of parameters;

comparing the second plurality of parameters with parameters of each configuration of the different configurations;

determining, based on comparing the second plurality of parameters with parameters of each configuration of the different configurations, whether the second plurality of parameters matches any configuration of the different configurations; and in response to determining that the second plurality of parameters matches a configuration of the different configurations, determining that the at least one conflict parameter is the highest-ranked parameter.

14. The system of claim 13, wherein the control circuitry is further configured to:

in response to determining that the second plurality of parameters does not match any configuration of the different configurations, select a third plurality of parameters by removing a second highest-ranked parameter from a first plurality of parameters;

compare the third plurality of parameters with parameters of each configuration of the different configurations;

determine, based on comparing the third plurality of parameters with parameters of each configuration of the different configurations, that the third plurality of parameters does not match any configuration of the different configurations;

compare a fourth plurality of parameters with parameters of each of the different configurations, wherein the fourth plurality of parameters comprises the first plurality of parameters without both the highest-ranked parameter and the second highest-ranked parameter; and in response to determining that parameters of any configuration of the different configurations matches the fourth plurality of parameters, determine that the at least one conflict parameter includes the highest-ranked parameter and the second highest-ranked parameter.

15. The system of claim 11, wherein selecting one of the plurality of different configurations that violates the smallest number of parameters and minimizes a number of conflict parameters removed from the plurality of parameters further comprises:

selecting, from the different configurations, a set of configurations with the lowest change to a total parameter score;

determine, for each configuration in the set of configurations, a number of removed conflict parameters; and selecting a configuration from the set of configurations with the smallest number of removed conflict parameters.

16. The system of claim 11, wherein selecting one of the plurality of different configurations that violates the smallest number of parameters and minimizes a number of conflict parameters removed from the plurality of parameters further comprises:

selecting, from the different configurations, a set of configurations with a smallest number of removed conflict parameters;

determining, for each configuration in the set of configurations, a change in a respective total parameter score; and selecting a configuration from the set of configurations with a smallest change in the respective total parameter score.

17. The system of claim 11, wherein the control circuitry is further configured to determine at least one conflict parameter whose removal from the plurality of parameters causes the conflict to be resolved by:

ranking each parameter of the plurality of parameters based on a respective parameter score, wherein the highest-ranked parameter is associated with a lowest parameter score and the lowest-ranked parameter is associated with the highest parameter score;

splitting the highest-ranked parameter into a first sub-parameter and a second sub-parameter;

generating a set of parameters that includes the plurality of parameters without the highest-ranked parameter;

simulating the assignment of the plurality of advertisements to the plurality of advertisement slots based on set of parameters and the first sub-parameter;

determining, based on simulating the assignment of the plurality of advertisements to the plurality of advertisement slots based on a set of parameters and the first sub-parameter that there is no conflict that prevents assigning the plurality of advertisements to the plurality of advertisement slots without violating at least one of the first sub-parameter and the set of parameters; and determining that removal of the highest-ranked parameter and addition of the first sub-parameter resolves the conflict.

18. The system of claim 17, wherein the control circuitry is further configured to determine whether the highest-ranked parameter can be split into multiple sub-parameters by:

determining whether the highest-ranked parameter is associated with a plurality of advertisers and a plurality of advertisement slots;

simulating splitting the highest-ranked parameter into a plurality of sub-parameters, wherein each sub-parameter of the plurality of sub-parameters is associated with one advertiser and at least one advertisement slot; and in response to successfully simulating the splitting, determining that the highest-ranked parameter can be split into multiple parameters.

19. The system of claim 11, further comprising communications circuitry, and wherein the control circuitry is further configured to receive, using the communications circuitry, the plurality of parameters via a network.

20. The system of claim 11, wherein the control circuitry is further configured to calculate a plurality of different total parameter scores based on the plurality of different configurations of the plurality of parameters in the plurality of parameters, wherein each calculated different total parameter score is based on the removal from the plurality of parameters, or modification within the plurality of parameters, of different ones of the at least one conflict parameter.

* * * * *